US012770235B2

(12) United States Patent
Dinh et al.

(10) Patent No.: US 12,770,235 B2
(45) Date of Patent: Oct. 20, 2026

(54) DEVICE AND METHOD FOR GENERATING IMAGE IN WHICH SUBJECT HAS BEEN CAPTURED

(71) Applicant: SAMSUNG ELECTRONICS CO., LTD., Suwon-si (KR)

(72) Inventors: Quockhanh Dinh, Suwon-si (KR); Kyonghwan Jin, Suwon-si (KR); Youngo Park, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 296 days.

(21) Appl. No.: 18/131,643

(22) Filed: Apr. 6, 2023

(65) Prior Publication Data

US 2023/0245285 A1 Aug. 3, 2023

Related U.S. Application Data

(63) Continuation of application No. PCT/KR2021/015056, filed on Oct. 26, 2021.

(30) Foreign Application Priority Data

Oct. 27, 2020 (KR) ........................ 10-2020-0140682
Nov. 11, 2020 (KR) ........................ 10-2020-0149890

(51) Int. Cl.
*G06T 5/92* (2024.01)
*G06V 10/44* (2022.01)
(Continued)

(52) U.S. Cl.
CPC ................ *G06T 5/92* (2024.01); *G06V 10/44* (2022.01); *G06V 10/56* (2022.01); *G06V 10/60* (2022.01);
(Continued)

(58) Field of Classification Search
CPC . G06T 5/92; G06T 2207/10024; G06V 10/44; G06V 10/56; G06V 10/60; H04N 1/6077
(Continued)

(56) References Cited

U.S. PATENT DOCUMENTS 8,339,475 B2 12/2012 Atanassov et al.
8,958,658 B1 2/2015 Lim et al.
(Continued)

FOREIGN PATENT DOCUMENTS

CN 106934426 A 7/2017
CN 109272441 A 1/2019
(Continued)

OTHER PUBLICATIONS

Office Action dated Jan. 30, 2024, issued by Korean Patent Office in Korean Patent Application No. 10-2020-0149890.
(Continued)

*Primary Examiner* — Akwasi M Sarpong
(74) *Attorney, Agent, or Firm* — Sughrue Mion, PLLC

(57) ABSTRACT

A device and a method for generating an output image in which a subject has been captured are provided. A method of performing image processing may include: obtaining a raw image by a camera sensor of the device, by using a first processor configured to control the device; inputting the raw image to a first artificial intelligence (AI) model trained to scale image brightness, by using a second processor configured to perform AI-based image processing on the raw image; obtaining tone map data output from the first AI model, by using the second processor; and storing an output image generated based on the tone map data.

17 Claims, 19 Drawing Sheets

(51) Int. Cl.
*G06V 10/56* (2022.01)
*G06V 10/60* (2022.01)
*H04N 1/60* (2006.01)

(52) U.S. Cl.
CPC . *H04N 1/6077* (2013.01); *G06T 2207/10024* (2013.01); *G06T 2207/20081* (2013.01); *G06T 2207/20084* (2013.01)

(58) Field of Classification Search
USPC ................................. 382/162, 167, 163, 164
See application file for complete search history.

(56) References Cited

U.S. PATENT DOCUMENTS

| | | | | |
|---|---|---|---|---|
| 9,313,416 | B2 | 4/2016 | Sasaki | |
| 9,648,356 | B2 | 5/2017 | Ward et al. | |
| 9,760,761 | B2 | 9/2017 | Iguchi et al. | |
| 9,779,476 | B2 | 10/2017 | Hsu et al. | |
| 9,826,149 | B2 | 11/2017 | Chalom et al. | |
| 10,460,231 | B2 | 10/2019 | Zhang et al. | |
| 10,474,933 | B2 | 11/2019 | Han et al. | |
| 10,650,503 | B2 | 5/2020 | Onuki | |
| 11,182,877 | B2 * | 11/2021 | Zhu | G06N 3/0985 |
| 12,165,434 | B2 * | 12/2024 | Manivannan | G06V 40/197 |
| 2014/0357978 | A1 * | 12/2014 | Pai | A61B 5/0042 600/587 |
| 2016/0187199 | A1 * | 6/2016 | Brunk | G01J 3/0208 348/89 |
| 2016/0300351 | A1 * | 10/2016 | Gazit | G06T 5/70 |
| 2017/0185871 | A1 | 6/2017 | Zhang et al. | |
| 2018/0174311 | A1 * | 6/2018 | Kluckner | G06V 10/25 |
| 2018/0235553 | A1 * | 8/2018 | Feng | A61B 6/037 |
| 2019/0114743 | A1 | 4/2019 | Lund et al. | |
| 2019/0325567 | A1 * | 10/2019 | Jones | G06T 5/92 |
| 2020/0082515 | A1 | 3/2020 | Cardei | |
| 2020/0089994 | A1 | 3/2020 | Sato | |
| 2020/0143519 | A1 * | 5/2020 | Gordon | G06T 3/4046 |
| 2020/0242451 | A1 | 7/2020 | Cao | |
| 2021/0035273 | A1 * | 2/2021 | Deng | G06T 5/92 |
| 2021/0272249 | A1 | 9/2021 | Han et al. | |
| 2021/0360179 | A1 * | 11/2021 | Dangi | G06N 3/084 |
| 2022/0036523 | A1 * | 2/2022 | Moran | G06T 1/20 |
| 2022/0044363 | A1 * | 2/2022 | Zhu | G06N 3/084 |
| 2022/0180507 | A1 * | 6/2022 | Lee | G16H 30/40 |
| 2022/0319215 | A1 | 10/2022 | Peng et al. | |
| 2025/0061574 | A1 * | 2/2025 | Yao | A61B 3/1225 |

FOREIGN PATENT DOCUMENTS

| | | | |
|---|---|---|---|
| CN | 110663045 | A | 1/2020 |
| CN | 111126273 | A | 5/2020 |
| CN | 111480169 | A | 7/2020 |
| JP | 3253334 | B2 | 2/2002 |
| KR | 10-2017-0078516 | A | 7/2017 |
| KR | 10-1828180 | B1 | 2/2018 |
| KR | 10-2018-0055573 | A | 5/2018 |
| KR | 10-2029852 | B1 | 10/2019 |
| KR | 10-2020-0009922 | A | 1/2020 |
| WO | 2020/017936 | A1 | 1/2020 |
| WO | 2020/187424 | A1 | 9/2020 |

OTHER PUBLICATIONS

Extended European Search Report dated Mar. 4, 2024, issued by European Patent Office in European Patent Application No. 21886736.4.
Office Action issued on Oct. 9, 2025 by the Chinese Patent Office in corresponding CN Patent Application No. 202180073360.2.
Communication issued on Apr. 10, 2026 by the Korean Ministry of Intellectual Property (MOIP) in Korean Patent Application No. 10-2025-0011878.
Communication issued on Feb. 5, 2026 by the European Patent Office in European Patent Application No. 21886736.4.
Andrey Ignatov et al., "Replacing Mobile Camera ISP with a Single Deep Learning Model", 2020 IEEE/CVF Conference on Computer Vision and Pattern Recognition Workshops (CVPRW), Oct. 7, 2020, pp. 2275-2285.
International Search Report (PCT/ISA/210) issued by the International Searching Authority on Feb. 9, 2022 in corresponding International Application No. PCT/KR2021/015056.
Written Opinion (PCT/ISA/237) issued by the International Searching Authority on Feb. 9, 2022 in corresponding International Application No. PCT/KR2021/015056.
Communication dated May 2, 2026, issued by the China National Intellectual Property Administration in Chinese Application No. 202180073360.2.

* cited by examiner

DEVICE AND METHOD FOR GENERATING IMAGE IN WHICH SUBJECT HAS BEEN CAPTURED

CROSS-REFERENCE TO RELATED APPLICATION

This application is a bypass continuation application of International Patent Application No. PCT/KR2021/015056, filed on Oct. 26, 2021, which claims priority from Korean Patent Application No. 10-2020-0140682, filed on Oct. 27, 2020, and Korean Patent Application No. 10-2020-0149890, filed on Nov. 11, 2020, in the Korean Intellectual Property Office, the disclosures of which are incorporated herein by reference in their entireties.

TECHNICAL FIELD

The disclosure relates to a device and method for processing a raw image by using an artificial intelligence (AI) model.

BACKGROUND

With the widespread use of mobile devices and advancements in communication network technology, consumer demand for mobile devices has diversified. This has led to the integration of various types of additional devices into mobile devices. In addition, the mobile devices are reduced in size and mobile devices now commonly feature a camera function for capturing subjects.

However, due to the reduction in size of the mobile devices, it may be challenging to mount a high-performance camera sensor in the mobile devices. Additionally, mobile devices require significant resources to process raw data.

Consequently, there is an increasing need for technology for generating images with various image features by using a camera sensor of a mobile device. Furthermore, there is a growing demand for an artificial intelligence (AI) technology capable of generating high dynamic range (HDR) images.

SUMMARY

An embodiment of the disclosure may provide a device and a method capable of generating an output image in which a subject has been captured by using an artificial intelligence (AI) model.

An embodiment of the disclosure may also provide a device and a method capable of obtaining an output image in which a subject has been captured by inputting, to an AI model, a raw image generated from a camera sensor.

An embodiment of the disclosure may also provide a device and a method capable of obtaining an output image in which a subject has been captured by using an AI model for generating a tone map.

An embodiment of the disclosure may also provide a device and a method capable of obtaining an output image in which a subject has been captured from a raw image by sequentially using a plurality of AI models.

An embodiment of the disclosure may also provide a device and a method capable of obtaining a live view image for capturing a subject and an output image in which the subject has been captured by using at least some of a plurality of AI models trained together.

An embodiment of the disclosure may also provide a device and a method capable of obtaining a live view image for capturing a subject and an output image in which a subject has been captured by using an AI model trained in relation to at least one of a preference of a user or a situation in which the subject is captured.

According to an aspect of the present disclosure, a method of performing image processing by a device, may include: obtaining a raw image by a camera sensor of the device, by using a first processor configured to control the device; inputting the raw image to a first artificial intelligence (AI) model trained to scale image brightness, by using a second processor configured to perform AI-based image processing on the raw image; obtaining tone map data output from the first AI model, by using the second processor; and storing an output image generated based on the tone map data.

The method may further include: inputting the raw image and the tone map data output from the first AI model, to a second AI model trained to analyze features of an image; obtaining a plurality of feature images output from the second AI model; modifying the plurality of feature images output from the second AI model, based on at least one setting for modifying the features of the image; and generating the output image based on the plurality of feature images modified based on the at least one setting.

The generating of the output image may include inputting the plurality of modified feature images to a third AI model for generating the output image, by using the second processor.

The first AI model may be pre-trained to generate a tone map for scaling brightness of each pixel of the raw image, wherein the second AI model may be pre-trained to analyze a plurality of preset features in the image, and wherein the third AI model may be pre-trained to regress the output image from a plurality of feature images.

The first AI model, the second AI model, and the third AI model may be jointly trained based on a reference raw image, and a reference output image that is generated by performing preset image signal processing (ISP) on the reference raw image.

The reference raw image may be a combination of a plurality of raw images that are generated in a burst mode. The first AI model, the second AI model, and the third AI model may be jointly trained, based on a loss between the reference output image, and an output image output through the first AI model, the second AI model, and the third AI model from the reference raw image.

The raw image may be generated through an image sensor and a color filter in the camera sensor, and may have any one pattern from among a Bayer pattern, a RGBE pattern, an RYYB pattern, a CYYM pattern, a CYGM pattern, a RGBW Bayer pattern, and an X-trans pattern.

The at least one setting may include at least one of a white balance adjustment setting or a color correction setting.

The first AI model, the second AI model, and the third AI model may be selected based on a user preference of the device.

The method may further include: generating a live view image from the raw image, without using at least one of the first AI model, the second AI model, or the third AI model; and displaying the generated live view image.

The method may further include retraining the first AI model, the second AI model, and the third AI model.

The retraining may further include: obtaining a reference image for the retraining, and a reference raw image corresponding to the reference image; and retraining the first AI model, the second AI model, and the third AI model, by using the reference image and the reference raw image.

According to another aspect of the present disclosure, a device for performing image processing may include: a camera sensor; a display; a first memory storing first instructions for controlling the device; a first processor configured to execute the first instructions stored in the first memory; a second memory storing at least one artificial intelligence (AI) model for performing image processing on a raw image, and second instructions related to execution of the at least one AI model; and a second processor configured to execute the at least one AI model and second instructions stored in the second memory. The first processor may be further configured to obtain the raw image by using the camera sensor. The second processor may be further configured to input the raw image to a first AI model trained to scale image brightness. The second processor may be further configured to obtain tone map data output from the first AI model. The first processor may be further configured to store, in the first memory, an output image generated based on the tone map data.

The second processor may be further configured to execute the second instructions to: input the raw image and the tone map data output from the first AI model, to a second AI model trained to analyze features of an image; obtain a plurality of feature images output from the second AI model; modify the plurality of feature images output from the second AI model, based on at least one setting for modifying features of the image; and generate an output image based on the plurality of feature images modified based on the at least one setting.

A non-transitory computer-readable recording medium having recorded thereon a program for executing the method of performing the image processing by the device.

An electronic device may include a camera sensor configured to capture a raw image; at least one memory storing instructions; at least one processor configured to execute the instructions to: input the raw image to an artificial intelligence (AI) model that includes a tone map generation model, a feature extraction model, and an image modification model; based on the electronic device being in an image capture mode, generate a process image by processing the raw image through the tone map generation model, the feature extraction model, and the image modification model of the AI model; and based on the electronic device being in a live camera view mode, generate a live view image by deactivating at least one model and activating at least one remaining model, among the tone map generation model, the feature extraction model, and the image modification model of the AI model, and processing the raw image through the at least one remaining model.

The tone map generation model may be trained to generate a tone adjusted image by scaling brightness of pixels of the raw image based on a tone map of the raw image. The feature extraction model may be trained to extract image features from the tone adjusted image. The image modification model may be trained to perform either one or both of white balance and color correction on the image features.

The AI model may be trained based on a loss between a reference output image that is obtained by performing non-AI based image signal processing (ISP) on a reference raw image, and an output image that is obtained by inputting the reference raw image to the AI model.

The raw image may be generated through an image sensor and a color filter in the camera sensor, and has any one pattern from among a Bayer pattern, a RGBE pattern, an RYYB pattern, a CYYM pattern, a CYGM pattern, an RGBW Bayer pattern, and an X-trans pattern.

DETAILED DESCRIPTION

Figure 1:
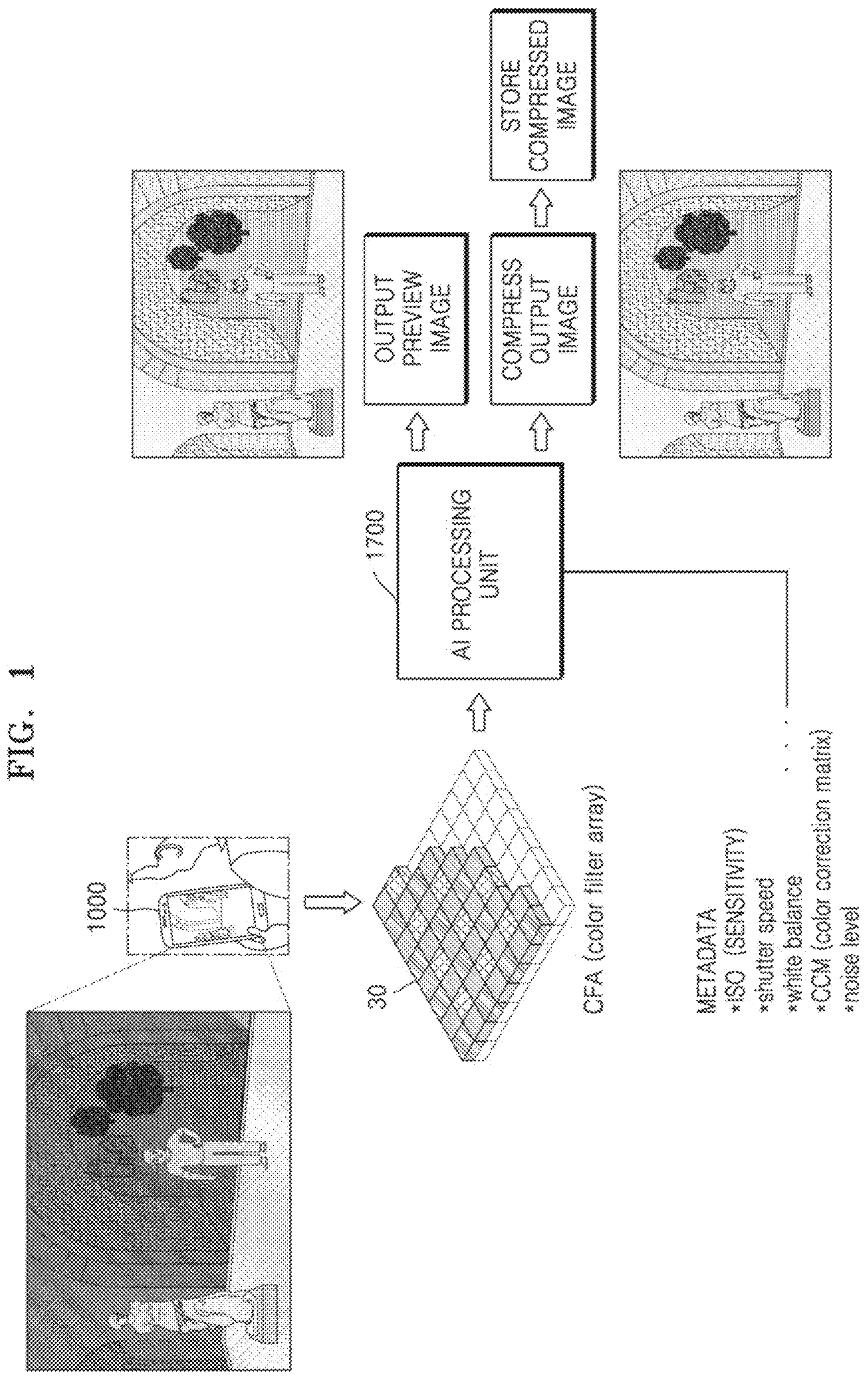
FIG. 1 is a view showing an example in which a device 1000 generates an output image by capturing a subject, according to an embodiment of the disclosure.

Hereinafter, the disclosure will be described in detail by explaining embodiments thereof with reference to the attached drawings in such a manner that it may easily be carried out by one of ordinary skill in the art. The disclosure may, however, be embodied in many different forms and should not be construed as being limited to the embodiments set forth herein. In the drawings, parts not related to the disclosure are not illustrated for clarity of explanation, and like elements are denoted by like reference numerals throughout.

Throughout the specification, when an element is referred to as being "connected to" another element, the element can be "directly connected to" the other element or be "electrically connected to" the other element via an intervening element. The terms "comprises", "comprising", "includes" and/or "including", when used herein, specify the presence of stated elements, but do not preclude the presence or addition of one or more other elements.

As used herein, an artificial intelligence (AI) processing unit may be a processing unit configured to process an image by using AI technology. For example, the AI processing unit is a processing unit designed for image processing using an AI model, and may be a processing unit dedicated to image processing. Alternatively, for example, the AI processing unit may be implemented by configuring a neural processing unit (NPU) for image processing using an AI model.

As used herein, an AI model is a model trained to generate, from a raw image, an output image which is a result of capturing a subject, and may include a plurality of sub AI models. The plurality of sub AI models included in the AI model may include a tone map generation model, a feature extraction model, an image modification model, and an image regression model. The tone map generation model may be an AI model trained to generate a tone map from the raw image, the feature extraction model may be an AI model trained to extract features in the raw image input to the feature extraction model, the image modification model may be an AI model trained to modify feature images output from the feature extraction model, and the image regression model may be an AI model trained to generate an output image in which the subject has been captured from the feature images.

As used herein, a tone map may be map data including information for scaling brightness of pixels in the raw image. The tone map may include map data for local tone mapping, which scales brightness of pixels in a specific part of the raw image, and/or global tone mapping, which scales brightness of the entire raw image.

As used herein, a live view image may be an image that is output on a display screen, allowing a user to preview the subject to be captured before taking the image in an image capture mode.

Reference will now be made in detail to embodiments, examples of which are illustrated in the accompanying drawings.

FIG. 1 is a view showing an example in which a device 1000 generates an output image by capturing a subject, according to an embodiment of the disclosure.

Referring to FIG. 1, the device 1000 may capture the subject by using an AI model for generating an output image in which the subject has been captured. The device 1000 may include an AI processing unit 1700 which is configured to generate an output image by inputting a raw image captured using a camera sensor of the device 1000, along with a preset setting value for image modification, into the AI model, and by obtaining an output image from the AI model. The AI model used by the AI processing unit 1700 is trained to generate, from the raw image, an output image that captures the subject of the raw image, and may include a plurality of sub AI models. The plurality of sub AI models included in the AI model may include an AI model for generating a tone map, an AI model for extracting features of an image, an AI model for modifying feature images representing the extracted features, and an AI model for generating the output image.

The AI processing unit 1700 of the device 1000 may use at least one of the plurality of sub AI models to generate a live view image for capturing the subject.

The device 1000 may be a smartphone, a personal computer (PC), a tablet PC, a smart television (TV), a cellular phone, a personal digital assistant (PDA), a laptop computer, a media player, a global positioning system (GPS), an e-book reader, a digital broadcast receiver, a navigation system, a kiosk, a digital camera, a home appliance, or another mobile or non-mobile computing device, but is not limited thereto. The device 1000 may be a wearable device having a communication function and a data processing function, e.g., a watch, glasses, a hairband, or a ring. However, the device 1000 is not limited thereto, and may include any type of device capable of capturing the subject.

The device 1000 may communicate with a server through a network to obtain an output image in which the subject has been captured. The network may be implemented as a wired network such as a local area network (LAN), a wide area network (WAN), or a value added network (VAN), or any wireless network such as a mobile radio communication network or a satellite communication network. The network may include a combination of two or more of a LAN, a WAN, a VAN, a mobile radio communication network, and a satellite communication network, comprehensively refers to a data communication network capable of enabling seamless communication between network entities, and may include a wired internet, a wireless internet, or a mobile wireless communication network. The wireless communication may include, for example, wireless LAN (or Wi-Fi), Bluetooth, Bluetooth low energy (BLE), Zigbee, Wi-Fi direct (WFD), ultra-wideband (UWB), Infrared Data Association (IrDA), or near field communication (NFC), but is not limited thereto.

Figure 2:
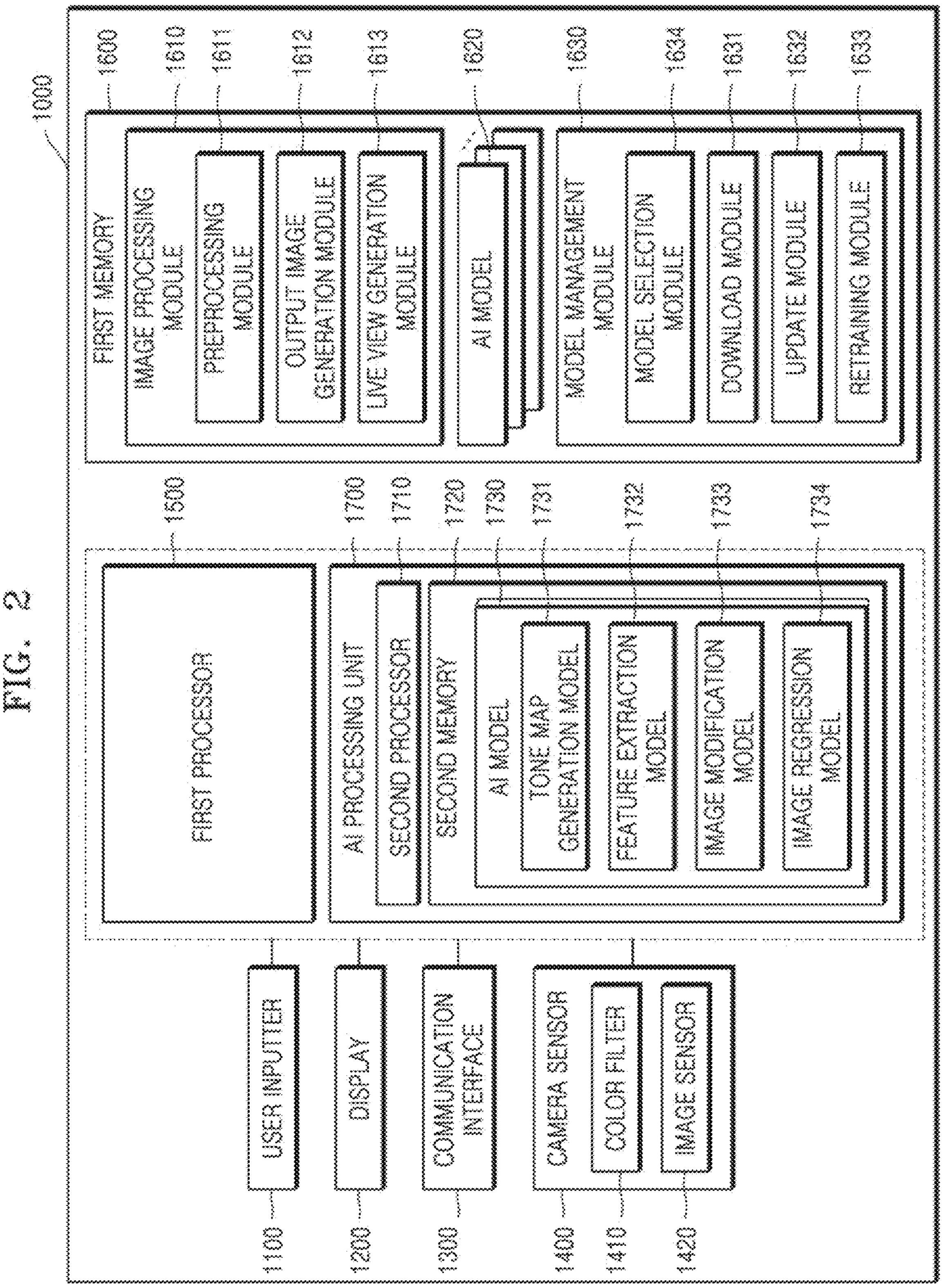
FIG. 2 is a block diagram of the device 1000 according to an embodiment of the disclosure.

FIG. 2 is a block diagram of the device 1000 according to an embodiment of the disclosure.

Referring to FIG. 2, the device 1000 according to an embodiment of the disclosure may include a user inputter 1100, a display 1200, a communication interface 1300, a camera sensor 1400, a first processor 1500, a first memory 1600, and the AI processing unit 1700. The AI processing unit 1700 may include a second processor 1710 configured to perform image processing by using AI technology, and a second memory 1720. For example, the AI processing unit 1700 is a processing unit designed for image processing using an AI model, and may be a processing unit dedicated to image processing. Alternatively, for example, the AI processing unit 1700 may be implemented by configuring a neural processing unit (NPU) for image processing using an AI model.

The user inputter 1100 refers to a means through which a user inputs data for controlling the device 1000. For example, the user inputter 1100 may include at least one of a keypad, a dome switch, a touchpad (e.g., a capacitive overlay, resistive overlay, infrared beam, surface acoustic wave, integral strain gauge, or piezoelectric touchpad), a jog wheel, or a jog switch, but is not limited thereto. The user inputter 1100 may receive, from a user of the device 1000, a user input for capturing a photo.

The display 1200 displays information processed in the device 1000. For example, the display 1200 may display a graphical user interface (GUI) for capturing a photo, a live view image, and an output image output as a result of capturing a photo.

Meanwhile, when the display 1200 is layered with a touchpad to configure a touchscreen, the display 1200 may be used not only as an output device but also as an input device. The display 1200 may include at least one of a liquid crystal display (LCD), a thin film transistor-liquid crystal display (TFT-LCD), an organic light-emitting diode (OLED), a flexible display, a three-dimensional (3D) display, or an electrophoretic display. Depending on implementation of the device 1000, the device 1000 may include two or more displays 1200.

The communication interface 1300 may include one or more elements capable of enabling communication with another device and a server. For example, the communication interface 1300 may include a short-range wireless communication unit, a mobile communication unit, and a broadcast receiver.

The short-range wireless communication unit may include a Bluetooth communication unit, a Bluetooth low energy (BLE) communication unit, a near field communication (NFC) unit, a wireless local area network (WLAN) communication unit, a Zigbee communication unit, an Infrared Data Association (IrDA) communication unit, a Wi-Fi direct (WFD) communication unit, an ultra-wideband (UWB) communication unit, or an Ant+ communication unit, but is not limited thereto. The mobile communication unit transmits and receives wireless signals to and from at least one of a base station, an external device, or a server on a mobile communication network. Herein, the wireless signals may include various types of data in accordance with transmission and reception of voice call signals, video call signals, or text/multimedia messages. The broadcast receiver receives broadcast signals and/or broadcast information from outside through broadcast channels. The broadcast channels may include satellite channels and terrestrial channels. Depending on an embodiment, the device 1000 may not include the broadcast receiver.

The communication interface 1300 may transmit and receive, to or from another device and a server, information required to manage an AI model 1620 for capturing a photo.

The camera sensor 1400 may include a color filter 1410 and an image sensor 1420, and generate a raw image of a subject under the control of the first or second processor 1500 or 1710 as described below. The camera sensor 1400 may generate the raw image of the subject under the control of the second processor 1710 based on a control signal of the first processor 1500, or under the independent control of the second processor 1710. For example, when the second processor 1710 is included in the camera sensor 1400, and when the first processor 1500 sends a control request signal for capturing an image to the camera sensor 1400, the second processor 1710 in the camera sensor 1400 may receive the control request signal and generate the raw image by controlling the camera sensor 1400. Alternatively, for example, when the second processor 1710 is provided outside the camera sensor 1400, and when the first processor 1500 sends a control request signal for capturing an image to the second processor 1710, the second processor 1710 may receive the control request signal and generate the raw image by controlling the camera sensor 1400. Alternatively, for example, the first processor 1500 may obtain the raw image by controlling the camera sensor 1400, and provide the obtained raw image to the second processor 1710.

The image sensor 1420, such as a complementary metal-oxide semiconductor (CMOS) or a charge-coupled device (CCD), generates a monochrome image. To obtain a color image, the color filter 1410 may be provided at a front end of the image sensor 1420 to only allow light of a specific frequency band in the visible light region to pass through the color filter 1410. The color filter 1410 may be divided into a plurality of regions corresponding to a plurality of colors, and each of the plurality of regions may pass only light of the same frequency band as one of three colors such as red, green, and blue. The light passing through the color filter 1410 is provided to the image sensor 1420 such as a CMOS or a CCD, and the image sensor 1420 may convert the received light into an electrical signal. For example, the electrical signal converted by the image sensor 1420 may include red, green, and blue values, and the raw image including an array of red, green, and blue values may be generated. The raw image may have a pattern based on an array pattern of the color filter 1410, e.g., any one pattern from among a Bayer pattern, a RGBE pattern, an RYYB pattern, a CYYM pattern, a CYGM pattern, a RGBW Bayer pattern, and an X-trans pattern.

The first memory 1600 may store programs for processing and control by at least one of the first or second processor 1500 or 1710 described below, and store data input to or to be output from the device 1000.

The first memory 1600 may include at least one type of storage medium from among flash memory, a hard disk, a multimedia card micro, a memory card (e.g., a secure digital (SD) or extreme digital (XD) memory card), random access memory (RAM), static random access memory (SRAM), read-only memory (ROM), electrically erasable programmable read-only memory (EEPROM), programmable read-only memory (PROM), magnetic memory, a magnetic disk, and an optical disc.

The programs stored in the first memory 1600 may be classified into a plurality of modules depending on functions thereof, and include, for example, an image processing module 1610, at least one AI model 1620, and a model management module 1630. The image processing module 1610 may include a preprocessing module 1611, an output image generation module 1612, and a live view generation module 1613, the AI model 1620 may include a plurality of sub AI models such as a tone map generation model, a feature extraction model, an image modification model, and an image regression model, and the model management module 1630 may include a model selection module 1634, a download module 1631, an update module 1632, and a retraining module 1633. The first processor 1500 normally controls overall operation of the device 1000. For example, the first processor 1500 may control the user inputter 1100, the display 1200, the communication interface 1300, the camera sensor 1400, and the first memory 1600 by executing the programs stored in the first memory 1600. The first processor 1500 may include one or more processors. In this case, the one or more processors may include at least one of a general-purpose processor (e.g., a central processing unit (CPU), an application processor (AP), or a digital signal processor (DSP)) or a dedicated graphics processor (e.g., a graphics processing unit (GPU) or a vision processing unit (VPU)).

The AI processing unit 1700 may include the second processor 1710 and the second memory 1720. While the second processor 1710 and the second memory 1720 may be primarily designed to perform image processing by using an AI model, they are not limited to this purpose.

The second memory 1720 may store programs for processing and control by the second processor 1710. For example, the second memory 1720 may store an AI model 1730 selected from among one or more AI models 1620 stored in the first memory 1600, and the AI model 1730 stored in the second memory 1720 may be executed by the second processor 1710. The AI model 1730 stored in the second memory 1720 may include a plurality of sub AI models such as a tone map generation model 1731, a feature extraction model 1732, an image modification model 1733, and an image regression model 1734.

The second memory 1720 may include at least one type of storage medium from among flash memory, a hard disk, a multimedia card micro, a memory card (e.g., a SD orXD memory card), RAM, SRAM, ROM, EEPROM, PROM, magnetic memory, a magnetic disk, and an optical disc.

The image processing module 1610 stored in the first memory 1600 may be executed by at least one of the first or second processor 1500 or 1710 to generate a live view image for previewing the subject in a live camera view mode, and to generate an output image after the subject is captured in an image capture mode. The live view image may be displayed on the display 1200, allowing a user to preview the subject before capturing the subject in an image, and the output image in which the subject has been captured may be saved as an image file in the device 1000 after the user captures the subject.

The first processor 1500 may generate the raw image of the subject by executing the preprocessing module 1611 stored in the first memory 1600. When a user input for capturing the subject received, the first processor 1500 may generate the raw image based on light provided through the color filter 1410 to the image sensor 1420 of the camera sensor 1400 at a timing when the user input is received. The first processor 1500 may generate the raw image including an array of, for example, red, green, and blue values.

The first processor 1500 may generate the output image in which the subject has been captured by executing the output image generation module 1612. The first processor 1500 may request the second processor 1710 to generate the output image by using the raw image. As such, the second processor 1710 may input the raw image to the AI model 1730 including the tone map generation model 1731, the feature extraction model 1732, the image modification model 1733, and the image regression model 1734, and obtain an output image output from the AI model 1730. The second processor 1710 may obtain a tone map by inputting the raw image to the tone map generation model 1731, obtain a plurality of feature images related to a plurality of features of the subject by inputting the generated tone map and the raw image to the feature extraction model 1732, modify the plurality of feature images by inputting the plurality of feature images to the image modification model 1733, and obtain the output image to be stored in the device 1000 by inputting the plurality of modified feature images to the image regression model 1734. The output image output from the AI model 1730 may be displayed on the display 1200 and stored in the first memory 1600 by the first processor 1500.

The AI model 1730 related to a situation in which the user captures the subject may be selected from among one or more AI models 1620 stored in the first memory 1600 and loaded into the second memory 1720, and a description thereof will be provided below.

The second processor 1710 may input the raw image to the tone map generation model 1731 to generate a tone map that is used to scale brightness of the red, green, and blue values in the raw image. For example, when the second processor 1710 is included in the camera sensor 1400, and when the first processor 1500 sends a control request signal for capturing an image to the camera sensor 1400, the second processor 1710 in the camera sensor 1400 may receive the control request signal, generate the raw image by controlling the camera sensor 1400, and input the raw image to the tone map generation model 1731. Alternatively, for example, when the second processor 1710 is provided outside the camera sensor 1400, and when the first processor 1500 sends a control request signal for capturing an image to the second processor 1710, the second processor 1710 may receive the control request signal, generate the raw image by controlling the camera sensor 1400, and input the raw image to the tone map generation model 1731. For example, the first processor 1500 may obtain the raw image by controlling the camera sensor 1400, and provide the obtained raw image to the second processor 1710, and in turn, the second processor 1710 may input the raw image to the tone map generation model 1731. The tone map may be map data including information for scaling brightness of pixels in the raw image. The tone map may be used to adjust brightness of pixels in a specific part of the raw image via local tone mapping, or brightness of the entire raw image via global tone mapping. For example, the tone map may be generated to scale or adjust brightness of a dark region more than that of a bright region in the raw image. The tone map generation model 1731 may be an AI model trained to generate a tone map from the raw image. The tone map generation model 1731 may include a plurality of neural network layers, and each of the plurality of neural network layers may have a plurality of weight values and perform neural network computation through computation between a computation result of a previous layer and the plurality of weight values. The plurality of weight values of the plurality of neural network layers may be optimized by a result of training the tone map generation model 1731 and, for example, the tone map generation model 1731 may be trained jointly with the feature extraction model 1732, the image modification model 1733, and the image regression model 1734. For example, the tone map generation model 1731 may include a convolutional neural network (CNN), but is not limited thereto.

The second processor 1710 may combine a plurality of raw images that are captured in a burst mode, input the combined raw images and the tone map to the feature extraction model 1732, and obtain a plurality of feature images output from the feature extraction model 1732. For example, the second processor 1710 may scale brightness of pixels in the raw image by using the tone map, and input the brightness-scaled raw image to the feature extraction model 1732. The raw image input to the feature extraction model 1732 may be scaled to increase brightness values of pixels in a dark part, and thus the subject positioned at the dark part in the raw image may be more effectively identified.

The feature extraction model 1732 may extract features in the raw image input to the feature extraction model 1732. The plurality of feature images separately representing a plurality of features in the raw image may be output from the feature extraction model 1732. For example, the plurality of feature images may include a feature image representing features related to edges in the raw image, a feature image representing features related to lines in the raw image, a feature image representing features related to spaces in the raw image, a feature image representing features related to shapes and depths of objects in the raw image, a feature image representing features related to people in the raw image, and a feature image representing features related to things in the raw image, but are not limited thereto.

The feature extraction model 1732 may be an AI model trained to extract features in the raw image input to the feature extraction model 1732. The feature extraction model 1732 may include a plurality of neural network layers, and each of the plurality of neural network layers may have a plurality of weight values and perform neural network computation through computation between a computation result of a previous layer and the plurality of weight values. The plurality of weight values of the plurality of neural network layers may be optimized by a result of training the feature extraction model 1732 and, for example, the feature extraction model 1732 may be trained together with the tone map generation model 1731, the image modification model 1733, and the image regression model 1734. For example, the feature extraction model 1732 may be implemented by a U-NET having an end-to-end fully convolutional network architecture as described below in relation to FIG. 5, but is not limited thereto.

The second processor 1710 may modify the feature images output from the feature extraction model 1732. The second processor 1710 may modify the feature images, based on preset settings related to image attributes. For example, the second processor 1710 may modify the feature images by using the image modification model 1733, based on preset criteria for white balance adjustment and color correction. The second processor 1710 may input, to the image modification model 1733, the feature images output from the feature extraction model 1732 and preset attribute values related to the image attributes, and obtain modified feature images output from the image modification model 1733.

In this case, the second processor 1710 may determine image attributes for modifying the feature images. For example, the image attributes for modifying the feature images may be determined based on a shooting environment of the device 1000. The second processor 1710 may obtain sensing data representing an ambient environment of the device 1000 at a timing when the subject is captured, through the camera sensor 1400, and input a white balance matrix value and color correction matrix value for modifying the feature images, to the image modification model 1733 together with the feature images, based on criteria preset according to the sensing data.

Alternatively, for example, the first processor 1500 may display a GUI for camera settings on the device 1000, and preset settings for white balance adjustment and color correction, based on a user input through the GUI.

Figure 13A:
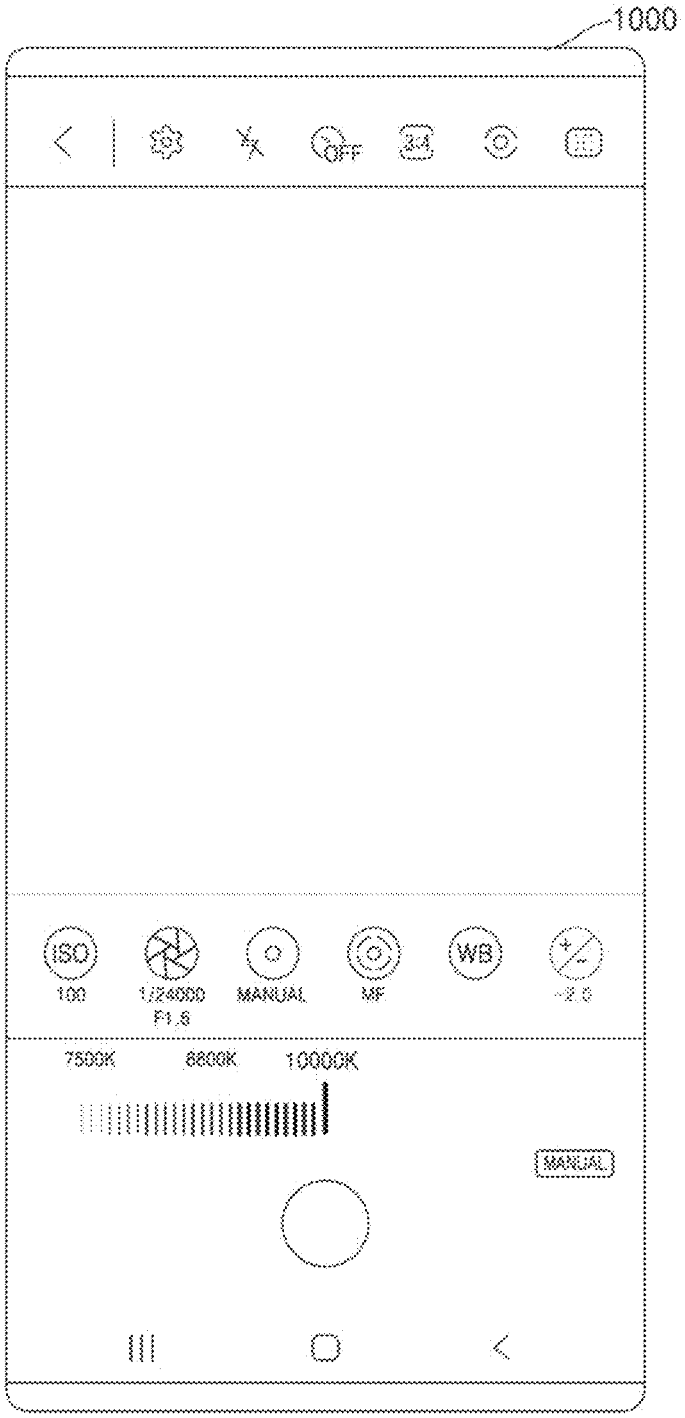
FIG. 13A is a view showing an example of a graphical user interface (GUI) for camera settings of the device 1000 for capturing a subject, according to an embodiment of the disclosure.
Figure 13B:
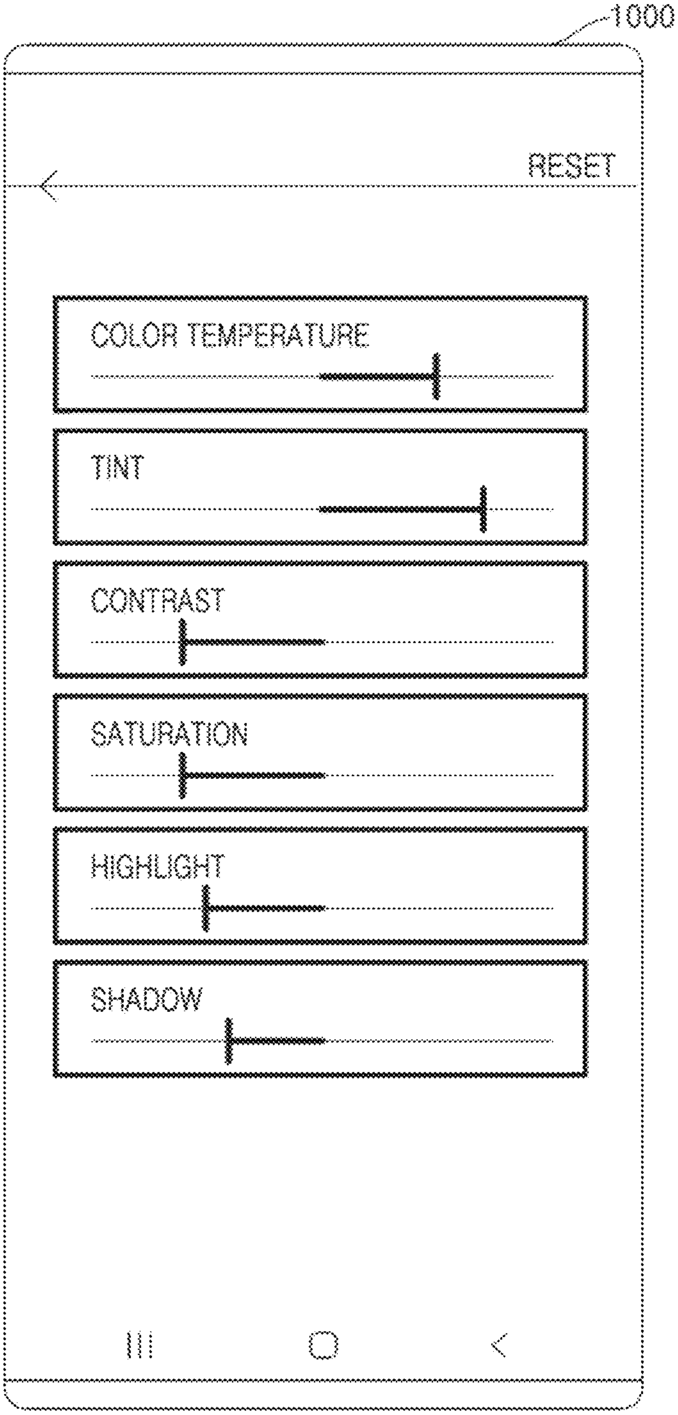
FIG. 13B is a view showing an example of a GUI for camera settings of the device 1000 for capturing a subject, according to an embodiment of the disclosure.

For example, the device 1000 may display, on the display 1200 as shown in FIGS. 13A and 13B, a GUI for camera settings of the device 1000 which captures the subject. As such, the user may input setting values related to ISO, shutter speed, white balance, color temperature, tint, contrast, saturation, highlight effect, shadow effect, etc. to the device 1000 through the GUI displayed on the display 1200.

In this case, the first processor 1500 may extract a white balance matrix value and a color correction matrix value from the first memory 1600, based on criteria preset by the user, and input the extracted white balance matrix value and color correction matrix value to the image modification model 1733 together with the feature images.

The image modification model 1733 may be an AI model trained to modify image attributes of the feature images input to the image modification model 1733. The image modification model 1733 may include a plurality of neural network layers, and each of the plurality of neural network layers may have a plurality of weight values and perform neural network computation through computation between a computation result of a previous layer and the plurality of weight values. The plurality of weight values of the plurality of neural network layers may be optimized through training of the image modification model 1733, and for example, the image modification model 1733 may be trained together with the tone map generation model 1731, the feature extraction model 1732, and the image regression model 1734.

Meanwhile, the white balance matrix value and the color correction matrix value are input to the image modification model 1733 in the above description, but are not limited thereto. A plurality of AI models 1620 may be separately trained based on settings related to white balance adjustment and color correction. In this case, to generate the output image, the AI model 1730 corresponding to a certain setting related to white balance adjustment and color correction may be loaded into the second memory 1720 and used by the second processor 1710. Although the white balance matrix value and the color correction matrix value are not input to the AI model 1730 loaded in the second memory 1720, the output image considering the certain setting related to white balance adjustment and color correction may be output from the AI model 1730 loaded in the second memory 1720.

The second processor 1710 may input the modified feature images to the image regression model 1734, and obtain an output image output from the image regression model 1734. The output image output from the image regression model 1734 may be an image to be stored in the device 1000 as a result of capturing the subject.

When a user input for capturing the subject is received, the image output through the AI model 1730 may be compressed based on certain criteria, and stored in the first memory 1600, but is not limited thereto.

The image regression model 1734 may be an AI model trained to generate an output image in which the subject has been captured from the feature images. The image regression model 1734 may include a plurality of neural network layers, and each of the plurality of neural network layers may have a plurality of weight values and perform neural network computation through computation between a computation result of a previous layer and the plurality of weight values. The plurality of weight values of the plurality of neural network layers may be optimized by a result of training the image regression model 1734 and, for example, the image regression model 1734 may be trained together with the tone map generation model 1731, the feature extraction model 1732, and the image modification model 1733. For example, the image regression model 1734 may include a CNN, but is not limited thereto.

The first processor 1500 may generate the live view image by executing the live view generation module 1613. When a user input for activating a camera function to capture the subject is received, the first processor 1500 may generate the live view image and display the generated live view image on the display 1200. For example, when a user input for executing a camera application installed in the device 1000 is received, the first processor 1500 may execute the camera application, generate the live view image, and display the live view image on the display 1200 such that the user may check the subject to be captured.

When the camera function of the device 1000 is activated, the first processor 1500 may generate the raw image used to generate the live view image, based on light input through the camera sensor 1400. To reduce a time taken to generate the live view image, the second processor 1710 may not use at least one of the models in the AI model 1730. The first processor 1500 may not use at least one of the tone map generation model 1731, the feature extraction model 1732, the image modification model 1733, or the image regression model 1734. In this case, a model not to be used to generate the live view image from among the tone map generation model 1731, the feature extraction model 1732, and the image regression model 1734 may be preset.

The second processor 1710 may input the raw image to the AI model 1730 including at least one deactivated model, and provide the live view image output from the AI model 1730, to the first processor 1500, and the first processor 1500 may display the live view image on the display 1200. In this case, the AI model 1730 may be pre-trained to output a satisfactory live view image while at least one of the models in the AI model 1730 is deactivated.

As such, when the camera application of the device 1000 is executed to activate the camera function, the live view image generated using a small resource of the device 1000 may be displayed on a screen of the device 1000 and, when a capture input of the user who desires to capture the subject is received, the output image generated through the AI model 1730 from the raw image generated at a timing when the capture input is received may be stored in the first memory 1600.

The first processor 1500 may select the AI model 1730 to be used by the second processor 1710, and update the AI model 1620 stored in the first memory 1600, by executing the model management module 1630.

The first processor 1500 may select the AI model 1730 to be used by the second processor 1710 from among one or more AI models 1620 stored in the first memory 1600, by executing the model selection module 1634. The AI model 1730 selected by the first processor 1500 may be loaded into the second memory 1720 of the AI processing unit 1700.

The first memory 1600 may store a plurality of AI models 1620, and the plurality of AI models 1620 may be AI models separately trained based on a plurality of situations. For example, the plurality of AI models 1620 may be AI models trained based on situations related to at least one of camera filters, camera lenses, camera manufacturers, device models, a plurality of images captured in a burst mode, shooting environments, subject types, or image attributes.

For example, the AI models trained based on camera filters may include an AI model trained based on images captured using an unsharp mask, an AI model trained based on images captured using an contrast adjustment mask, and an AI model trained based on images captured using a color filter mask, but are not limited thereto. For example, the AI models trained based on camera lenses may include an AI model trained based on images captured using a telephoto lens, an AI model trained based on images captured using a wide-angle lens, and an AI model trained based on images captured using a fisheye lens, but are not limited thereto. For example, the AI models trained based on camera manufacturers may include an AI model trained based on images captured using a camera from manufacturer A, an AI model trained based on images captured using a camera from manufacturer B, and an AI model trained based on images captured using a camera from manufacturer C, but are not limited thereto. For example, the AI models trained based on devices may include an AI model trained based on images captured using Galaxy S10, an AI model trained based on images captured using Galaxy S20, and an AI model trained based on images captured using Galaxy Note 20, but are not limited thereto.

For example, the AI models trained based on shooting environments may include an AI model trained based on images captured in an indoor environment, an AI model trained based on images captured in an outdoor environment, and an AI model trained based on images captured in a specific luminance range, but are not limited thereto. For example, the AI models trained based on subject types may include an AI model trained based on images of people, an AI model trained based on images of food, and an AI model trained based on images of buildings, but are not limited thereto. For example, the AI models trained based on image attributes may include an AI model trained based on images captured by applying a specific white balance value, an AI model trained based on images captured by applying a specific ISO value, and an AI model trained based on images captured at a specific shutter speed, but are not limited thereto.

When the camera application of the device 1000 is executed to activate the camera function, the first processor 1500 may identify a situation related to at least one of camera filters, camera lenses, camera manufacturers, device models, a plurality of images captured in a burst mode, shooting environments, subject types, or image attributes by executing the model selection module 1634. For example, the first processor 1500 may identify at least one situation, based on sensing values obtained by sensing an ambient environment of the device 1000, and setting values of the camera application.

The first processor 1500 may display a certain GUI for camera settings on the display 1200, and identify at least one situation, based on values set based on a user input through the GUI. For example, the first processor 1500 may display, on the display 1200 as shown in FIGS. 13A and 13B, a GUI for camera settings of the device 1000 which captures the subject. As such, the user may input setting values related to ISO, shutter speed, white balance, color temperature, tint, contrast, saturation, highlight effect, shadow effect, etc. to the device 1000 through the GUI displayed on the display 1200.

The first processor 1500 may extract the AI model 1730 corresponding to the identified at least one situation from among one or more AI models 1620 stored in the first memory 1600, and load the same into the second memory 1720. For example, the user may set setting values related to ISO, white balance, color temperature, tint, saturation, contrast, etc. through the GUI displayed on the display 1200 of the device 1000, and the device 1000 may select the AI model 1730 corresponding to the setting values set by the user from among the plurality of AI models 1620 stored in the first memory 1600, and load the selected AI model 1730 into the second memory 1720.

The first processor 1500 may extract the AI model 1730 corresponding to a preference of the user, from the first memory 1600 to load the same into the second memory 1720, based on information about at least one of, for example, a camera filter used more than a certain number of times by the user, a camera lens used more than a certain number of times by the user, a manufacturer of a camera used more than a certain number of times by the user, a device model used more than a certain number of times by the user, a shooting environment provided more than a certain number of times, a type of subject captured more than a certain number of times by the user, or image attributes used more than a certain number of times by the user.

The first processor 1500 may display, for example, preset images and load, into the second memory 1720, the AI model 1730 trained to output an image having features similar to those of at least one image selected by the user from among the displayed images. For example, when the user often selects an edge-enhanced image, the AI model 1730 trained to output an edge-enhanced image may be loaded into the second memory 1720.

When the AI model 1730 corresponding to the identified at least one situation is not stored in the first memory 1600, the first processor 1500 may request the AI model 1730 from a server, and receive the AI model 1730 from the server to store the same in the second memory 1720.

The first processor 1500 may receive a retrained AI model 1620 or data for retraining the AI model 1620, from the server by executing the download module 1631. The first processor 1500 may request the retrained AI model 1620 from the server. The AI model 1620 may be retrained by the server, and the server may provide, to the device 1000, notification information indicating that the retrained AI model 1620 is present. The first processor 1500 may display, on the screen, the notification information received from the server, and receive a user input for updating the AI model 1620. The first processor 1500 may provide information about photo attributes preferred by the user, to the server to request the retrained AI model 1620 from the server. The information about the photo attributes preferred by the user may include information about at least one of, for example, a camera filter used more than a certain number of times by the user, a camera lens used more than a certain number of times by the user, a manufacturer of a camera used more than a certain number of times by the user, a device model used more than a certain number of times by the user, a shooting environment provided more than a certain number of times, a type of subject captured more than a certain number of times by the user, or image attributes used more than a certain number of times by the user. When the first processor 1500 has provided, to the server, the information about the photo attributes preferred by the user, the first processor 1500 may download, from the server, the AI model 1620 retrained in relation to the photo attributes preferred by the user. The first processor 1500 may update the AI model 1620 in the device 1000 by replacing the AI model 1620 in the device 1000 with the retrained AI model 1620 received from the server, by executing the update module 1632.

The first processor 1500 may download a reference raw image for retraining and a reference image corresponding to the reference raw image, from the server by executing the download module 1631. The reference image may be an image generated from the reference raw image for retraining. The first processor 1500 may request and receive, from the server, the reference raw image and the reference image for retraining the AI model 1620. In this case, the first processor 1500 may provide, to the server, the information about the photo attributes preferred by the user. The information about the photo attributes preferred by the user may include information about at least one of, for example, a camera filter used more than a certain number of times by the user, a camera lens used more than a certain number of times by the user, a manufacturer of a camera used more than a certain number of times by the user, a device model used more than a certain number of times by the user, a shooting environment provided more than a certain number of times, a type of subject captured more than a certain number of times by the user, or image attributes used more than a certain number of times by the user. In this case, the server may provide, to the device 1000, the reference image and the reference raw image generated in relation to the photo attributes preferred by the user.

The first processor 1500 may obtain the reference raw image for retraining and the reference image corresponding to the reference raw image, by executing the retraining module 1633, and the second processor 1710 may retrain the AI model 1620. The second processor 1710 may use the reference image received from the server, as a ground truth (GT) image, and retrain the AI model 1620 by inputting the reference raw image received from the server, to the AI model 1620 and comparing an output image output from the AI model 1620, with the reference image.

Meanwhile, the device 1000 generates the output image in which the subject has been captured by using the AI model 1620 in the device 1000 in the above description, but is not limited thereto. The device 1000 may generate the output image in which the subject has been captured together with the server. For example, the device 1000 may generate the raw image and transmit the generated raw image to the server to request the output image from the server. The device 1000 may provide the raw image and setting information for image modification together to the server. In this case, the AI model 1620 may be included in the server, and the server may generate the output image from the raw image by using the AI model 1620 in the server. The server may provide the generated output image to the device 1000.

Alternatively, for example, the device 1000 may provide the raw image and the tone map output from the tone map generation model 1731, to the server to request the output image from the server. The device 1000 may provide the raw image, the tone map, and the setting information for image modification together to the server. In this case, the feature extraction model 1732, the image modification model 1733, and the image regression model 1734 in the AI model 1620 may be included in the server, and the server may generate the output image by using the feature extraction model 1732, the image modification model 1733, and the image regression model 1734 in the server. The server may provide the generated output image to the device 1000.

Alternatively, for example, the device 1000 may provide the feature images output from the feature extraction model 1732, to the server to request the output image from the server. The device 1000 may provide the feature images and the setting information for image modification together to the server. In this case, the image modification model 1733 and the image regression model 1734 in the AI model 1620 may be included in the server, and the server may generate the output image by using the image modification model 1733 and the image regression model 1734 in the server. The server may provide the generated output image to the device 1000.

The device 1000 may determine whether to generate the output image independently or together with the server, based on a situation of the device 1000. For example, the device 1000 may determine whether to generate the output image independently or together with the server, in consideration of a battery level, resource usage, or a communication state. For example, when the battery level of the device 1000 is less than a threshold value, the device 1000 may request the server to generate the output image. For example, when the resource usage of the device 1000 is greater than a threshold value, the device 1000 may request the server to generate the output image. For example, when the communication state of the device 1000 is good, the device 1000 may request the server to generate the output image. In this case, when the device 1000 requests the output image from the server, it may be set whether to provide the raw image, provide the raw image and the tone map, or provide the feature images, based on various criteria according to the situation of the device 1000. For example, when the camera function is activated, the device 1000 may identify the battery level, the resource usage, or the communication state, and determine whether to provide the raw image, provide the raw image and the tone map, or provide the feature images to the server. The device 1000 may provide at least one of the raw image, the tone map, or the feature images to the server, based on the determination to request the output image from the server.

Figure 3:
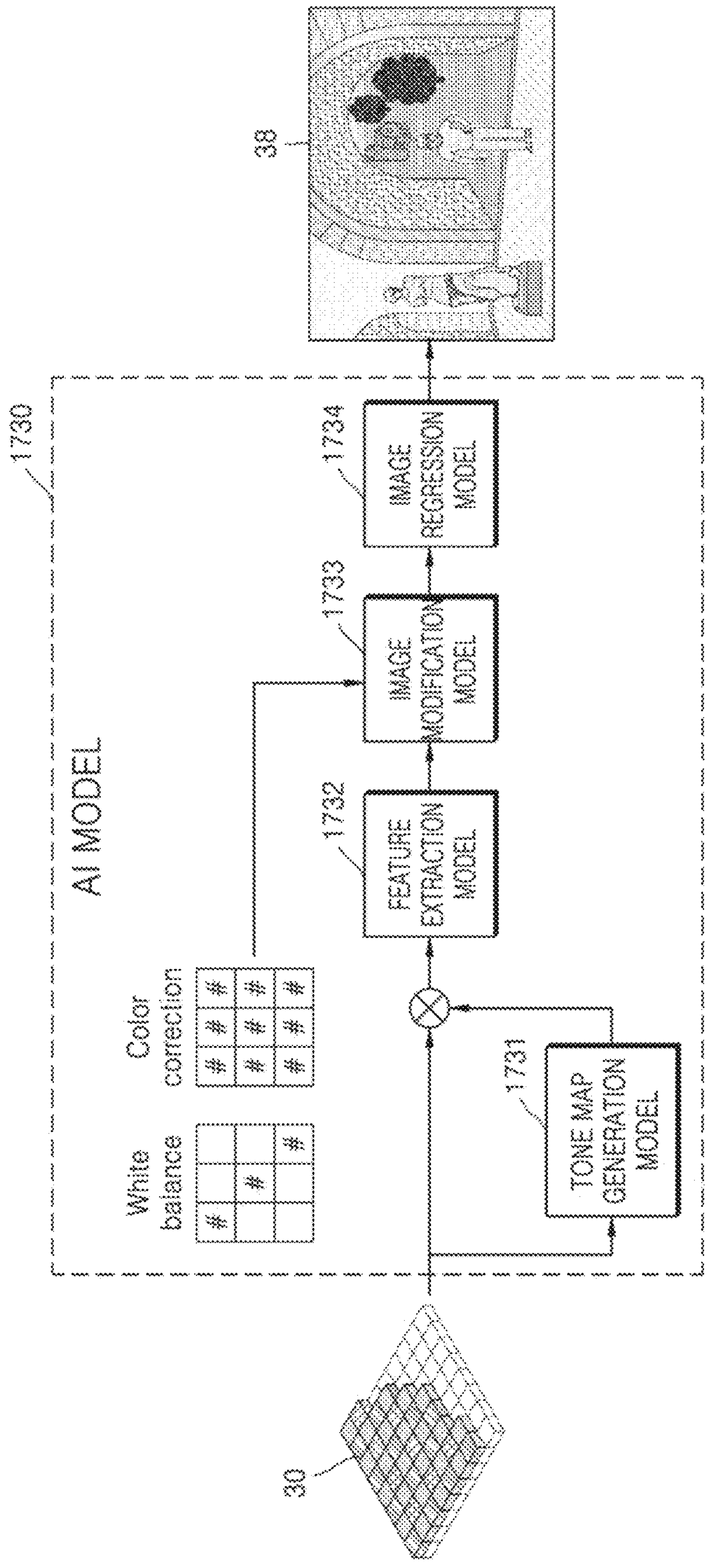
FIG. 3 is a view for describing a process of generating an output image in which a subject has been captured from a raw image, according to an embodiment of the disclosure.

FIG. 3 is a view for describing a process of generating an output image in which a subject has been captured from a raw image, according to an embodiment of the disclosure.

Referring to FIG. 3, using the AI processing unit 1700, the device 1000 may input a raw image 30 corresponding to a subject to the tone map generation model 1731 and obtain a tone map output from the tone map generation model 1731. The device 1000 may combine a plurality of raw images that are captured in a burst mode, input the combined raw images 30 and the tone map to the feature extraction model 1732, and obtain a plurality of feature images output from the feature extraction model 1732. Then, the device 1000 may input the plurality of feature images to the image modification model 1733 and obtain modified feature images output from the image modification model 1733. After that, the device 1000 may input the modified feature images to the image regression model 1734 and thus obtain an output image 38 output from the image regression model 1734.

Each of the tone map generation model 1731, the feature extraction model 1732, the image modification model 1733, and the image regression model 1734 may include a plurality of neural network layers. Each of the plurality of neural network layers may have a plurality of weight values and perform neural network computation through computation between a computation result of a previous layer and the plurality of weight values. The plurality of weight values of the plurality of neural network layers may be optimized by a result of training an AI model. For example, the plurality of weight values may be updated to reduce or minimize a loss value or a cost value obtained by the AI model during the training process. An artificial neural network may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, but is not limited to the above-mentioned examples. The tone map generation model 1731, the feature extraction model 1732, the image modification model 1733, and the image regression model 1734 may be trained together by using a reference raw image and a reference output image as described below in relation to FIG. 7.

Figure 4A:
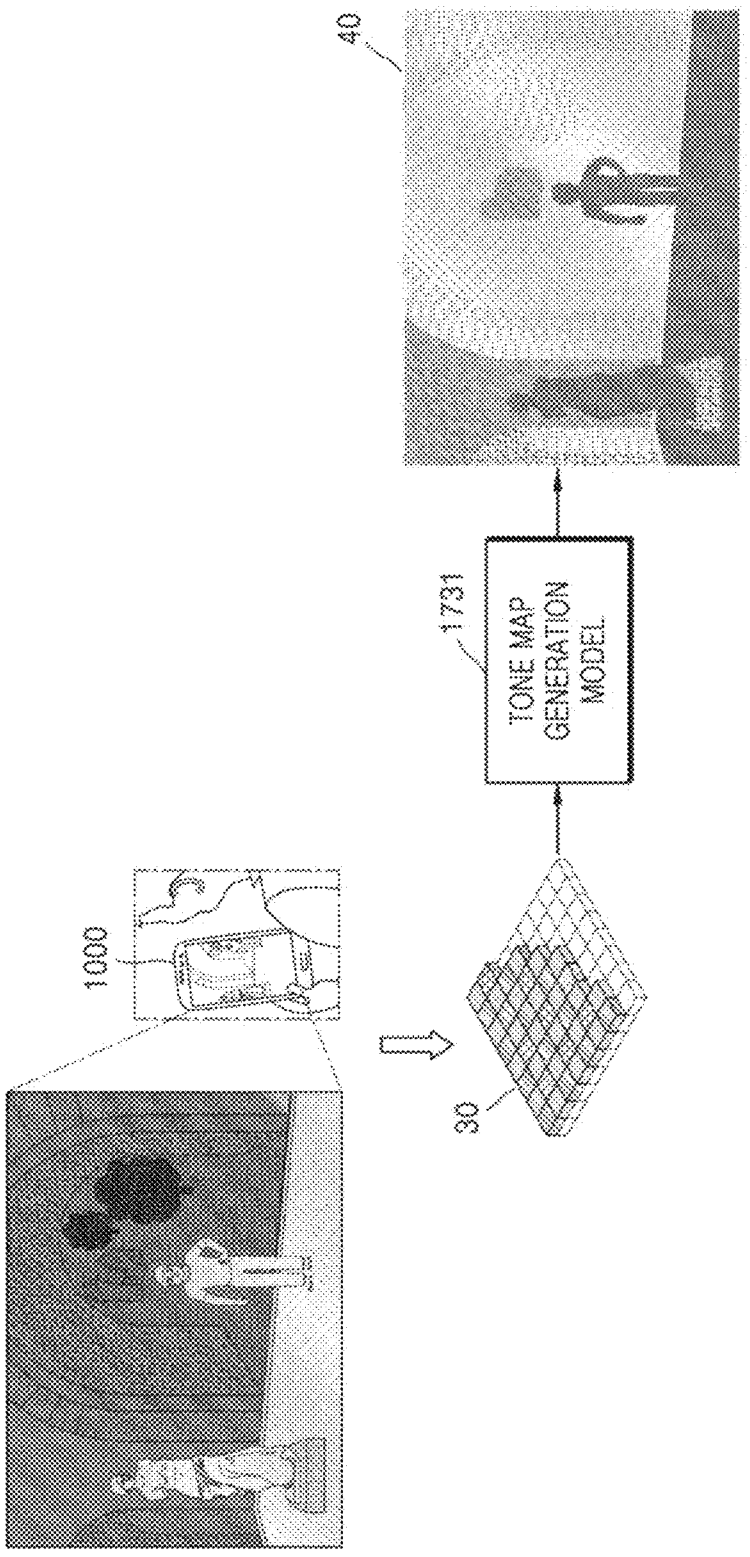
FIG. 4A is a view for describing a process, performed by the device 1000, of generating a tone map from a raw image 30, according to an embodiment of the disclosure.

FIG. 4A is a view for describing a process, performed by the device 1000, of generating a tone map from the raw image 30, according to an embodiment of the disclosure.

Referring to FIG. 4A, when a camera application of the device 1000 is executed to activate a camera function, the device 1000 may generate the raw image 30. When a function for capturing a subject is activated, the device 1000 may generate raw images based on light provided from the subject, by using the camera sensor 1400 and, when a user input for capturing the subject is received, the device 1000 may obtain the raw image 30 generated by the camera sensor 1400 at a timing when the user input is received. The raw image 30 may include, for example, an array of red, green, and blue values.

When the camera function is activated, the device 1000 may identify at least one situation for capturing the subject, extract the AI model 1730 corresponding to the identified at least one situation, from the first memory 1600 to load the same into the second memory 1720 in the AI processing unit 1700. When the AI model 1730 corresponding to the identified at least one situation is not stored in the first memory 1600, the device 1000 may request the AI model 1730 from a server, and receive the AI model 1730 from the server to load the same into the second memory 1720.

Then, to generate a tone map 40 used to scale brightness of the red, green, and blue values in the raw image 30, the device 1000 may receive a user input for capturing the subject after the camera application is executed, and input the raw image 30 to the tone map generation model 1731 in response to the received user input. The tone map 40 may include information for scaling brightness of pixels in the raw image 30. For example, the tone map 40 may be generated to scale brightness of a dark region more than that of a bright region in the raw image 30.

The tone map generation model 1731 may include a plurality of neural network layers, and each of the plurality of neural network layers may have a plurality of weight values and perform neural network computation through computation between a computation result of a previous layer and the plurality of weight values. The plurality of weight values of the plurality of neural network layers may be optimized by a result of training the tone map generation model 1731 and, for example, the tone map generation model 1731 may be trained together with the feature extraction model 1732, the image modification model 1733, and the image regression model 1734. For example, the tone map generation model 1731 may include a CNN, but is not limited thereto.

Figure 4B:
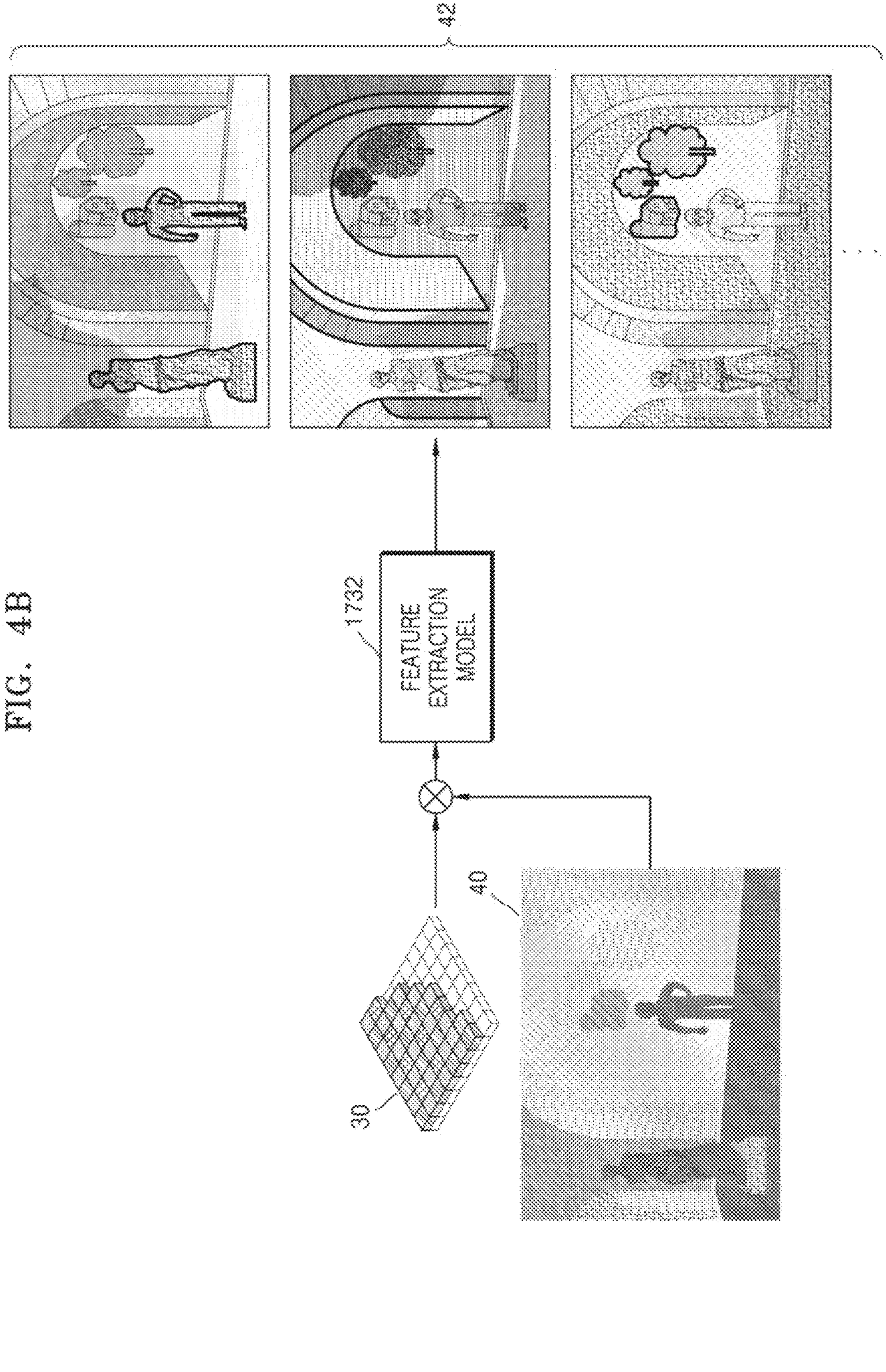
FIG. 4B is a view for describing a process, performed by the device 1000, of extracting features from the raw image 30, according to an embodiment of the disclosure.

FIG. 4B is a view for describing a process, performed by the device 1000, of extracting features from the raw image 30, according to an embodiment of the disclosure.

Referring to FIG. 4B, the device 1000 may combine a plurality of raw images that are captured in a burst mode, input the combined raw images 30 and the tone map 40 to the feature extraction model 1732, and obtain a plurality of feature images 42 output from the feature extraction model 1732. For example, the device 1000 may scale brightness of pixels in the raw image 30 by using the tone map 40, and input the brightness-scaled raw image 30 to the feature extraction model 1732. The raw image 30 input to the feature extraction model 1732 may be scaled to increase brightness values of pixels in a dark part, and thus the subject positioned at the dark part in the raw image 30 may be more effectively identified.

The feature extraction model 1732 may extract features in the raw image 30 input to the feature extraction model 1732. The plurality of feature images 42 separately representing a plurality of features in the raw image 30 may be output from the feature extraction model 1732. For example, the plurality of feature images 42 may include a feature image representing features related to edges in the raw image 30, a feature image representing features related to lines in the raw image 30, a feature image representing features related to spaces in the raw image 30, a feature image representing features related to shapes and depths of objects in the raw image 30, a feature image representing features related to people in the raw image 30, and a feature image representing features related to things in the raw image 30, but are not limited thereto.

The feature extraction model 1732 may include a plurality of neural network layers, and each of the plurality of neural network layers may have a plurality of weight values and perform neural network computation through computation between a computation result of a previous layer and the plurality of weight values. The plurality of weight values may be optimized through training the feature extraction model 1732. For example, the feature extraction model 1732 may be trained together with the tone map generation model 1731, the image modification model 1733, and the image regression model 1734. For example, the feature extraction model 1732 may be implemented by a U-NET having an end-to-end fully convolutional network architecture as described below in relation to FIG. 5. However, this is not the only possible implementation for the feature extraction model 1732.

Figure 4C:
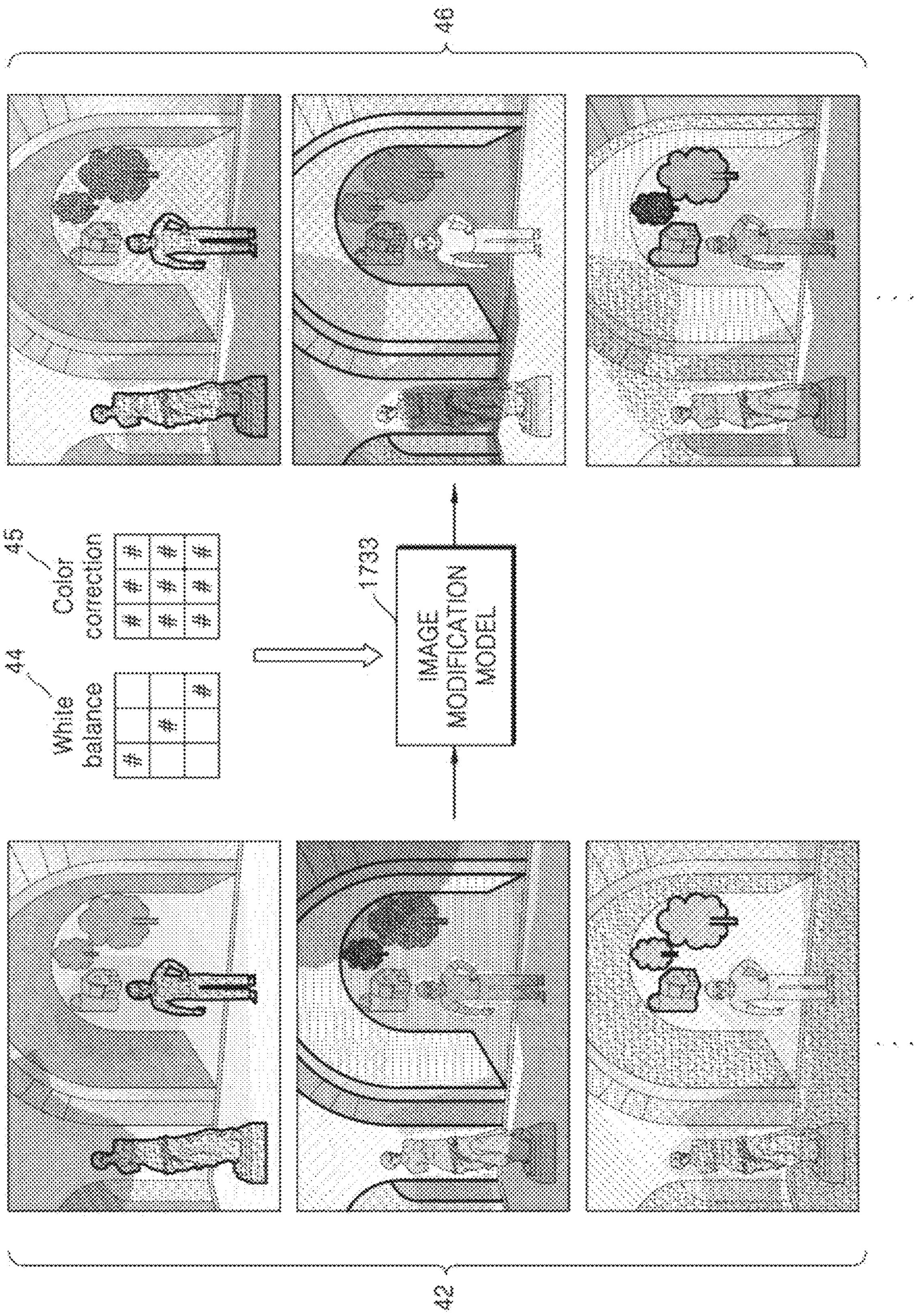
FIG. 4C is a view for describing a process, performed by the device 1000, of modifying feature images, according to an embodiment of the disclosure.

FIG. 4C is a view for describing a process, performed by the device 1000, of modifying feature images, according to an embodiment of the disclosure.

Referring to FIG. 4C, the device 1000 may modify the feature images 42 that are output from the feature extraction model 1732. The device 1000 may modify the feature images 42 by inputting the feature images 42 output from the feature extraction model 1732 and setting values related to image attributes to the image modification model 1733. For example, the device 1000 may modify the feature images 42, based on preset criteria for white balance adjustment and color correction.

For example, the first processor 1500 of the device 1000 may generate sensing data that represents an ambient environment of the device 1000 at a timing when a subject is captured, by using a sensor in the device 1000, automatically identify the ambient environment of the device 1000, based on the generated sensing data, and extract a white balance matrix 44 and color correction matrix 45 for modifying the feature images, from the first memory 1600 based on preset criteria. The first processor 1500 may provide the extracted white balance matrix 44 and color correction matrix 45 to the second processor 1710. The second processor 1710 may input the white balance matrix 44 and color correction matrix 45 received from the first processor 1500, to the image modification model 1733 together with the feature images 42.

Alternatively, for example, when a camera function is activated, the first processor 1500 may display a GUI on the display 1200 for settings related to white balance adjustment and color correction of the feature images 42, and preset settings for white balance adjustment and color correction, based on a user input through the GUI. The first processor 1500 may extract the white balance matrix 44 and the color correction matrix 45 from the first memory 1600, based on the settings according to the user input, and provide the white balance matrix 44 and the color correction matrix 45 to the second processor 1710. The second processor 1710 may input the white balance matrix 44 and color correction matrix 45 received from the first processor 1500, to the image modification model 1733 together with the feature images 42.

The device 1000 modifies the feature images 42 by using the image modification model 1733 in the above description, but is not limited thereto. The device 1000 may modify the feature images 42 without using the image modification model 1733. In this case, the device 1000 may modify the feature images 42 by using a matrix for modifying image attributes. For example, the device 1000 may adjust white balance of the feature images 42 by multiplying each of the feature images 42 by the white balance matrix 44 for white balance adjustment. The device 1000 may correct colors of the feature images 42 by multiplying each of the feature images 42 by the color correction matrix 45 for color correction.

In the above description, the white balance matrix value and the color correction matrix value are mentioned as inputs to the image modification model 1733, but they are not the only possible inputs. A plurality of AI models 1620 may be separately trained based on settings related to white balance adjustment and color correction. In this case, to generate an output image, the AI model 1730 corresponding to a certain setting related to white balance adjustment and color correction may be loaded into the second memory 1720 and used by the second processor 1710. Although the white balance matrix value and the color correction matrix value are not input to the AI model 1730 loaded in the second memory 1720, the output image considering the certain setting related to white balance adjustment and color correction may be output from the AI model 1730 loaded in the second memory 1720.

Figure 4D:
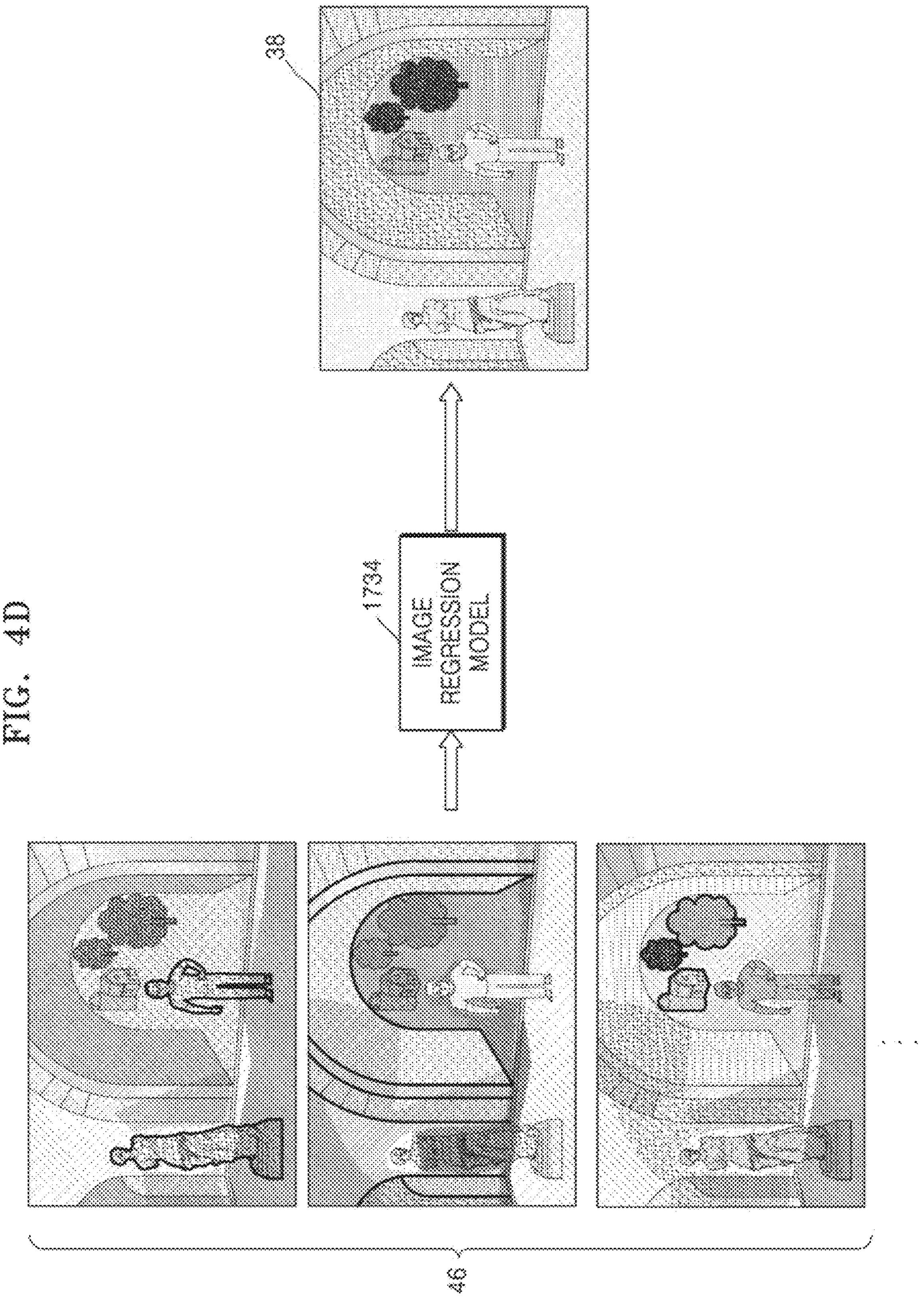
FIG. 4D is a view for describing a process, performed by the device 1000, of generating an output image from modified feature images, according to an embodiment of the disclosure.

FIG. 4D is a view for describing a process, performed by the device 1000, of generating an output image from modified feature images, according to an embodiment of the disclosure.

The device 1000 may input modified feature images 46 to the image regression model 1734, and obtain an output image 38 that is output from the image regression model 1734. The output image 38 may capture a subject and may be stored in the device 1000. The image regression model 1734 may include a plurality of neural network layers, and each of the plurality of neural network layers may have a plurality of weight values and perform neural network computation through computation between a computation result of a previous layer and the plurality of weight values. The plurality of weight values of the plurality of neural network layers may be optimized through training the image regression model 1734 and, for example, the image regression model 1734 may be trained together with the tone map generation model 1731 and the feature extraction model 1732. For example, the image regression model 1734 may include a CNN, but is not limited thereto.

Figure 5:
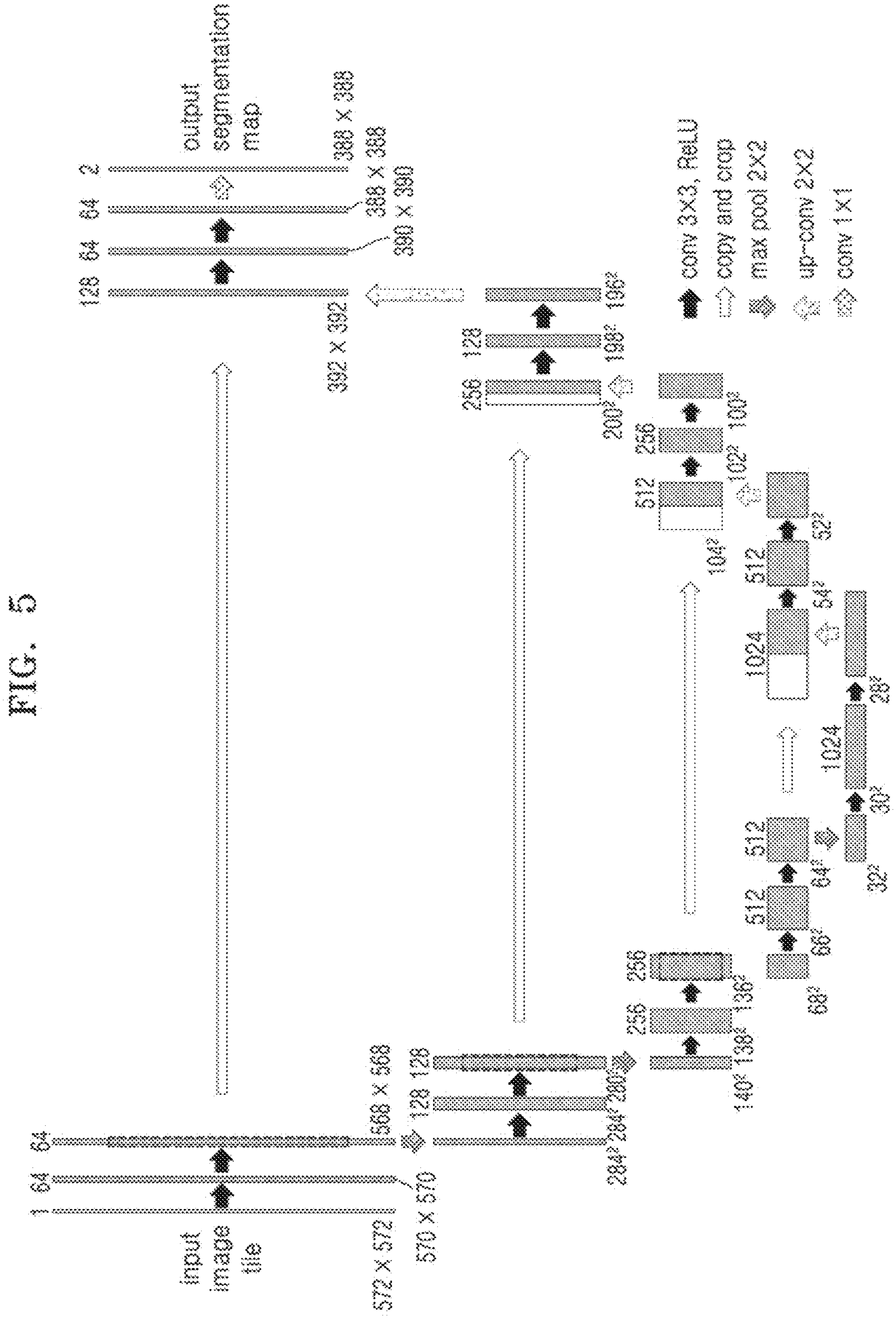
FIG. 5 is a view showing an example of a structure of a feature extraction model 1732, according to an embodiment of the disclosure.

FIG. 5 is a view showing an example of a structure of the feature extraction model 1732, according to an embodiment of the disclosure.

Referring to FIG. 5, the feature extraction model 1732 may be implemented using a U-NET structure, which is an end-to-end fully convolutional network architecture. The feature extraction model 1732 may include layers of a contraction path configured to capture context of an input image, and layers of an expansion path for performing up-sampling to obtain a high-resolution result from a feature image of the contraction path. The layers of the contraction path may be symmetrical to the layers of the expansion path.

Figure 6:
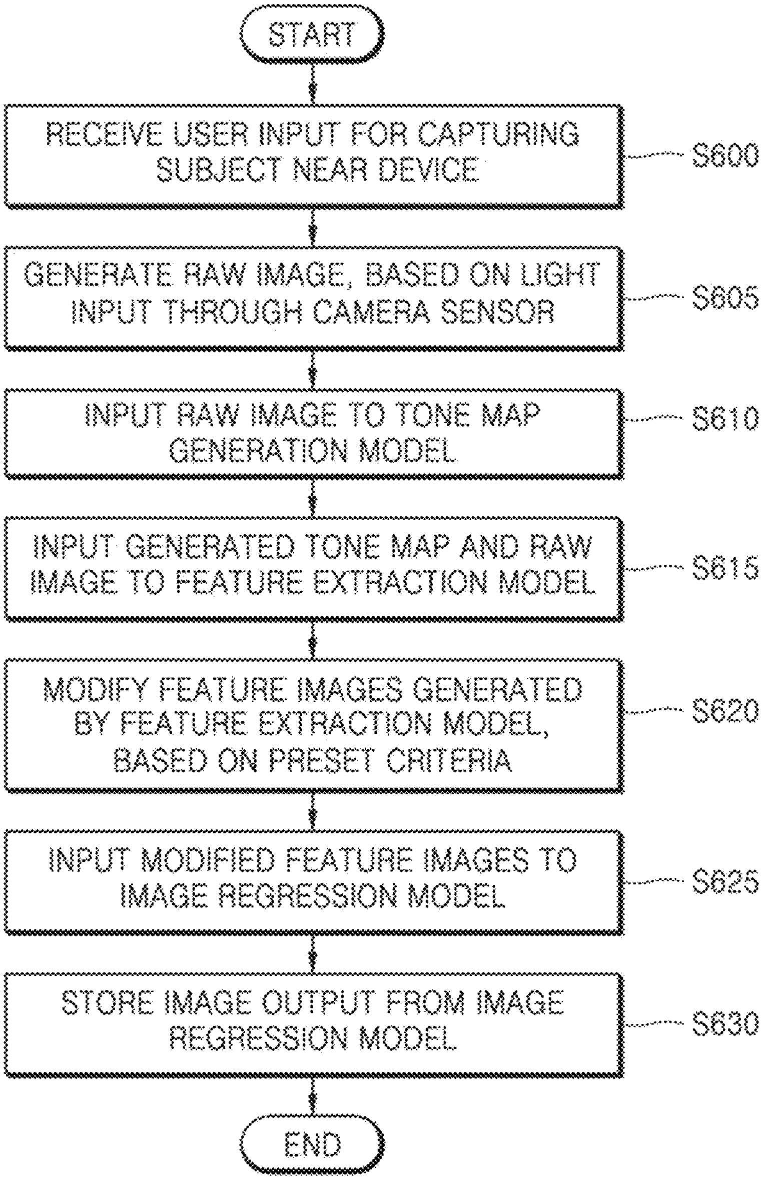
FIG. 6 is a flowchart of a method, performed by the device 1000, of generating an output image by capturing a subject, according to an embodiment of the disclosure.

FIG. 6 is a flowchart of a method, performed by the device 1000, of generating an output image by capturing a subject, according to an embodiment of the disclosure.

In operation S600, the device 1000 may receive a user input to capture a subject near the device 1000, and in operation S605, the device 1000 may generate a raw image, based on light input through the camera sensor 1400. When the user activates a function for capturing the subject, the device 1000 may generate raw images based on light provided from the subject, by using the camera sensor 1400 and, when a user input for capturing the subject is received, the device 1000 may obtain a raw image generated by the camera sensor 1400 at a timing when the user input is received.

In operation S610, the device 1000 may input the raw image to the tone map generation model 1731. The device 1000 may input the raw image to the tone map generation model 1731, and obtain a tone map output from the tone map generation model 1731.

In operation S615, the device 1000 may input the generated tone map and the raw image to the feature extraction model 1732. The device 1000 may scale brightness of pixels in the raw image by using the tone map, and input the brightness-scaled raw image to the feature extraction model. The device 1000 may obtain feature images output from the feature extraction model 1732.

In operation S620, the device 1000 may modify the feature images generated by the feature extraction model 1732, based on preset criteria. The device 1000 may modify the feature images, based on preset settings related to image attributes. For example, the device 1000 may modify the feature images, based on preset criteria for white balance adjustment and color correction, but the preset criteria for modifying the feature images are not limited thereto.

In operation S625, the device 1000 may input the modified feature images to the image regression model 1734, and in operation S630, the device 1000 may store an output image output from the image regression model 1734.

Figure 7:
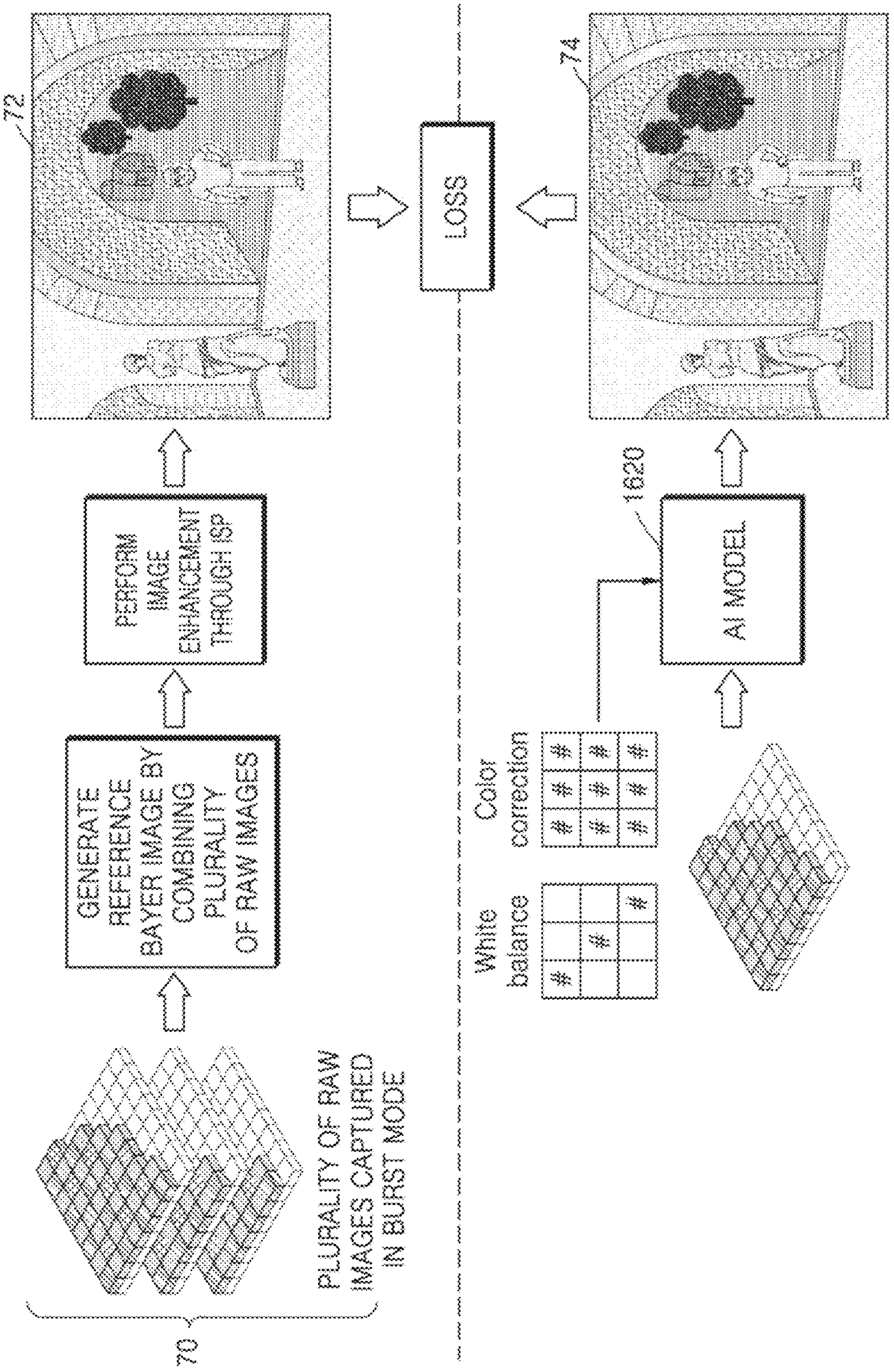
FIG. 7 is a view showing an example of training an AI model 1620, according to an embodiment of the disclosure.

FIG. 7 is a view showing an example of training the AI model 1620, according to an embodiment of the disclosure.

Referring to FIG. 7, a reference image 72 generated by performing image signal processing (ISP) on a reference raw image may be used as a GT image for training the AI model 1620. For example, the reference raw image may be generated by combining a plurality of raw images 70 generated by capturing a subject in a burst mode for a short period of time, and the reference image 72 may be output by performing ISP processing on the reference raw image. Existing ISP processing may be existing image processing performed on a raw image without using an AI model, e.g., image processing including preprocessing, white balance adjustment, demosaicing, gamma correction, color correction, etc. performed on a raw image without using an AI model. The output reference image 72 may be used as a GT image of the AI model. Alternatively, one of the plurality of raw images 70 generated by capturing the subject in a burst mode for a short period of time may be selected, and an image output by performing existing ISP processing on the selected raw image may be used as a GT image.

To train the AI model 1620, the reference raw image or one of the plurality of raw images 70 captured in a burst mode may be input to the AI model 1620. For example, when eight raw images are generated in a burst mode, a reference raw image may be generated by combining the eight raw images, and the reference raw image and a reference image generated from the reference raw image through existing ISP processing may be used to train the AI model 1620. Alternatively, for example, when eight raw images are generated in a burst mode, eight output images may be separately generated from the eight raw images through existing ISP processing. In this case, one of the eight raw images may be selected, and the selected raw image and an output image corresponding to the selected raw image may be used to train the AI model 1620.

Setting information for modifying image attributes of feature images may be input to the AI model 1620. The setting information for modifying image attributes may include, for example, a preset matrix for white balance adjustment and a preset matrix for color correction. Setting information of various settings may be input to the AI model 1620 to train the AI model 1620 based on various image attributes.

A certain reference raw image including noise may be input to the AI model 1620 to train the AI model 1620. In this case, reference raw images including gradually increasing noise may be input to the AI model 1620 to train the AI model 1620. For example, a server or the device 1000 may generate n input images by using reference raw images including noise of first to nth levels, and input the n input images to the AI model 1620 to train the AI model 1620. As such, the AI model 1620 may be trained to output a denoised output image from a raw image including noise.

To minimize a loss between the reference image 72 and an output image 74 that is generated by the AI model 1620, weight values of neural network layers in the AI model 1620 may be tuned or adjusted. Specifically, the AI model 1620 may include the tone map generation model 1731, the feature extraction model 1732, and the image regression model 1734, and thus weight values of neural network layers in the tone map generation model 1731, weight values of neural network layers in the feature extraction model 1732, and weight values of neural network layers in the image regression model 1734 may be tuned together.

Figure 8:
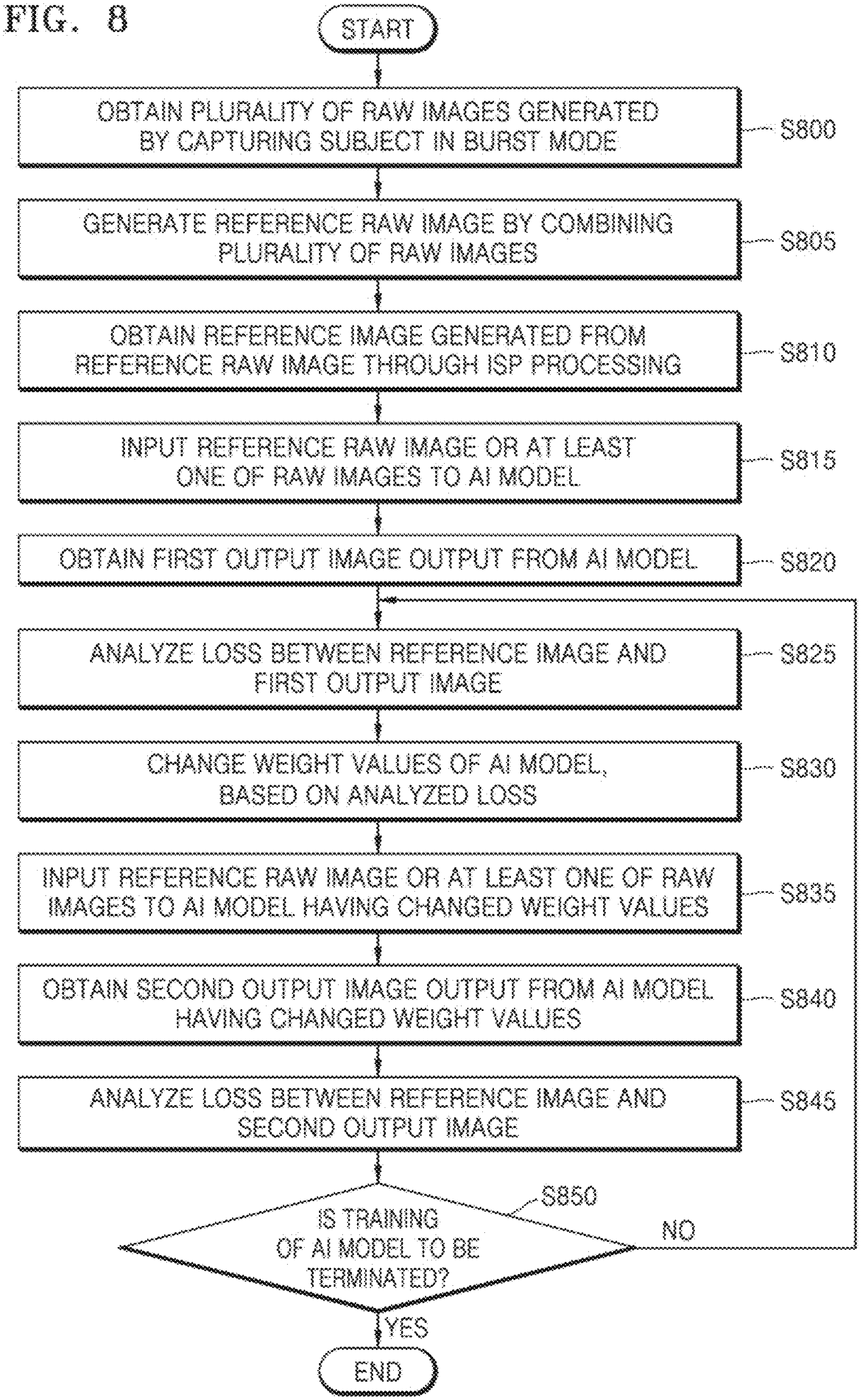
FIG. 8 is a flowchart of a method of training the AI model 1620, according to an embodiment of the disclosure.

FIG. 8 is a flowchart of a method of training the AI model 1620, according to an embodiment of the disclosure.

In operation S800, a server may obtain a plurality of raw images generated by capturing a subject in a burst mode. The server may obtain the plurality of raw images generated by capturing the subject in a burst mode for a short period of time. Because the plurality of raw images are generated in a burst mode, the plurality of raw images may have similar image information.

In operation S805, the server may generate a reference raw image by combining the plurality of raw images. The server may generate one reference raw image by combining the plurality of raw images by using image fusion.

In operation S810, the server may obtain a reference image generated from the reference raw image through ISP processing. ISP processing may be existing image processing performed on a raw image without using an AI model, e.g., image processing including preprocessing, white balance adjustment, demosaicing, gamma correction, color correction, etc. performed on a raw image without using an AI model. The reference image generated through ISP processing may be used as a GT image of the AI model 1620.

In operation S815 and S820, the server may obtain a first output image output from the AI model 1620. The server may input the reference raw image or one of the plurality of raw images to the AI model 1620 (S815), and obtain the first output image output from the AI model 1620 (S820). The AI model 1620 to be trained by the server may include the elements of the AI model 1620 shown in FIG. 3.

In operation S825, the server may analyze a loss between the reference image and the first output image. The server may use the reference image as a GT image, and compare the reference image with the first output image.

In operation S830, the server may change weight values of the AI model 1620, based on the analyzed loss. The server may tune weight values of neural network layers in the AI model 1620 to reduce the loss between the reference image and the first output image. In this case, the AI model 1620 may include the tone map generation model 1731, the feature extraction model 1732, and the image regression model 1734, and thus weight values of neural network layers in the tone map generation model 1731, weight values of neural network layers in the feature extraction model 1732, and weight values of neural network layers in the image regression model 1734 may be tuned together.

In operation S835, the server may input the reference raw image or at least one of the raw images to the AI model 1620 having the changed weight values, in operation S840, the server may obtain a second output image output from the AI model 1620 having the changed weight values and, in operation S845, the server may analyze a loss between the reference image and the second output image.

In operation S850, the server may determine whether to terminate training of the AI model 1620. When the loss analyzed in operation S845 is less than a preset threshold value, the server may determine to terminate training of the AI model 1620 and, when the loss analyzed in operation S845 is greater than the preset threshold value, the server may repeat the operations for changing the weight values of the AI model 1620.

Meanwhile, a plurality of AI models 1620 may be trained based on a plurality of situations. For example, the plurality of AI models 1620 may be trained based on situations related to at least one of camera filters, camera lenses, camera manufacturers, device models, a plurality of images captured in a burst mode, shooting environments, subject types, or image attributes.

For example, the AI models 1620 may be trained using reference raw images and reference images captured using an unsharp mask, reference raw images and reference images captured using an contrast adjustment mask, and reference raw images and reference images captured using a color filter mask, but are not limited thereto. For example, the AI models 1620 may be trained using reference raw images and reference images captured based on camera lenses, and the camera lenses may include, for example, a telephoto lens, a wide-angle lens, and a fisheye lens, but are not limited thereto. For example, the AI models 1620 may be trained using reference raw images and reference images captured based on camera manufacturers, or reference raw images and reference images captured based on device models, but are not limited thereto. For example, the AI models 1620 may be trained using reference raw images and reference images captured in an indoor environment, reference raw images and reference images captured in an outdoor environment, and reference raw images and reference images captured in a specific luminance range, but are not limited thereto. For example, the AI models 1620 may be trained using reference raw images and reference images of people, reference raw images and reference images of food, and reference raw images and reference images of buildings, but are not limited thereto. For example, the AI models 1620 may be trained using reference raw images and reference images captured based on image attributes, and the image attributes may include, for example, white balance, ISO, and shutter speed, but are not limited thereto.

Meanwhile, the AI model 1620 is trained by the server in the description related to FIG. 8, but is not limited thereto. The AI model 1620 may be trained by the device 1000. In this case, the device 1000 may directly generate the reference raw image and the reference image to be used to train the AI model 1620, or request and receive the same from the server.

For example, the device 1000 may provide images captured by the device 1000, to the server to request the reference raw image and the reference image for training the AI model 1620 from the server. The server may analyze the images received from the device 1000 and provide, to the device 1000, the reference raw image and the reference image related to a situation preferred by a user of the device 1000. For example, the server may identify the situation preferred by the user, e.g., a type of the device 1000 used by the user, a type of a subject in the images captured by the device 1000, an image style preferred by the user, or an environment of a place where the user usually shoots (e.g., indoor, outdoor, luminance, or weather), by analyzing the images received from the device 1000. Alternatively, for example, the device 1000 may provide information about a camera type or a lens type of the device 1000, to the server to request the reference raw image and the reference image for training the AI model 1620 from the server. The server may provide, to the device 1000, the reference raw image and the reference image related to the camera type or the lens type received from the device 1000.

Alternatively, the device 1000 may provide user preference information indicating an image style, a shooting environment, and subjects preferred by the user, to the server to request the reference raw image and the reference image for training the AI model 1620 from the server. The server may provide, to the device 1000, the reference raw image and the reference image related to the user preference information received from the device 1000.

Figure 9:
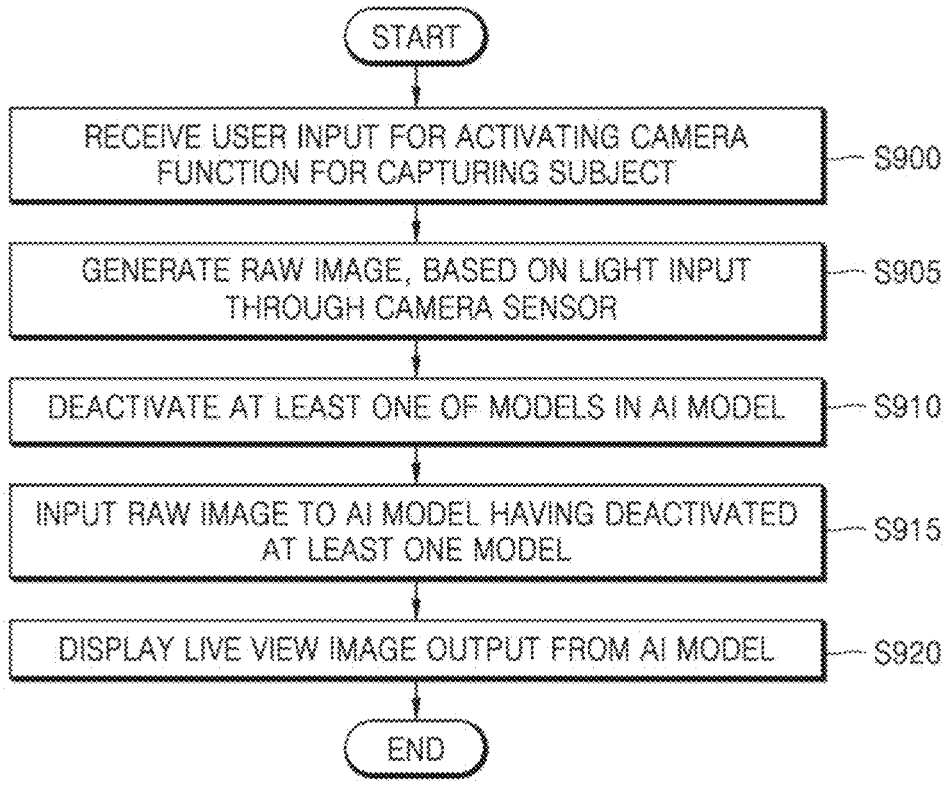
FIG. 9 is a flowchart of a method, performed by the device 1000, of outputting a live view image, according to an embodiment of the disclosure.

FIG. 9 is a flowchart of a method, performed by the device 1000, of outputting a live view image, according to an embodiment of the disclosure.

In operation S900, the device 1000 may receive a user input for activating a camera function for capturing a subject. For example, the device 1000 may receive a user input for executing a camera application installed in the device 1000.

In operation S905, the device 1000 may generate a raw image, based on light input through the camera sensor 1400. When the camera function is activated, the device 1000 may generate the raw image used to generate a live view image.

In operation S910, the device 1000 may deactivate at least one of models in the AI model 1730. The device 1000 may deactivate at least one of the tone map generation model 1731, the feature extraction model 1732, the image modification model 1733, or the image regression model 1734. A model to be deactivated to generate the live view image from among the tone map generation model 1731, the feature extraction model 1732, the image modification model 1733, or the image regression model 17344 may be preset.

In operation S915, after deactivating at least one model in the AI model 1730, the device 1000 may input the raw image to the remaining active model(s) in the AI model 1730. In operation S920, the device 1000 may display, on a screen, a live view image output from the AI model 1730. In this case, the AI model 1620 may be pre-trained to output a satisfactory live view image even with one or more models in the AI model 1620 are deactivated.

Meanwhile, the live view image is generated using the AI model 1730 in which at least one of the tone map generation model 1731, the feature extraction model 1732, the image modification model 1733, or the image regression model 1734 is deactivated, in the above description, but is not limited thereto. The live view image may be generated using the AI model 1730 in which the tone map generation model 1731, the feature extraction model 1732, the image modification model 1733, and the image regression model 1734 are all activated.

Meanwhile, an output image in which the subject has been captured may be generated and stored using the AI model 1730 in which at least one of the tone map generation model

1731, the feature extraction model 1732, the image modification model 1733, or the image regression model 1734 is deactivated.

Figure 10A:
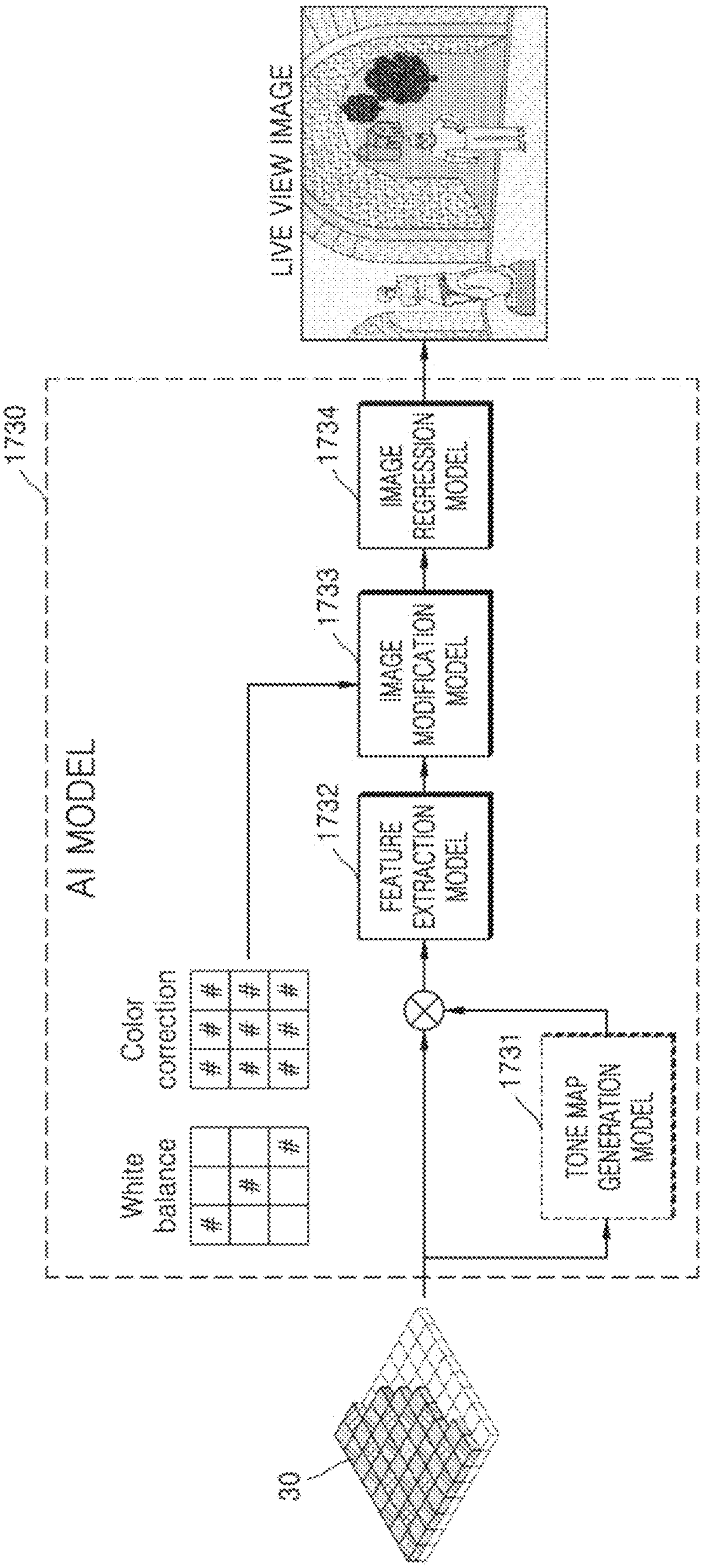
FIG. 10A is a view showing an example of deactivating a tone map generation model 1731 in an AI model 1730 to generate a live view image, according to an embodiment of the disclosure.

FIG. 10A is a view showing an example of deactivating the tone map generation model 1731 in the AI model 1730 to generate a live view image, according to an embodiment of the disclosure.

Referring to FIG. 10A, while the tone map generation model 1731 in the AI model 1730 is deactivated, a raw image may be input to the AI model 1730. The raw image may be input to the feature extraction model 1732, feature images output from the feature extraction model 1732 may be modified, the modified feature images may be input to the image regression model 1734, and a live view image may be output from the image regression model 1734. In this case, the AI model 1730 may be a model trained in the same manner as in FIG. 7 while the tone map generation model 1731 is deactivated.

Figure 10B:
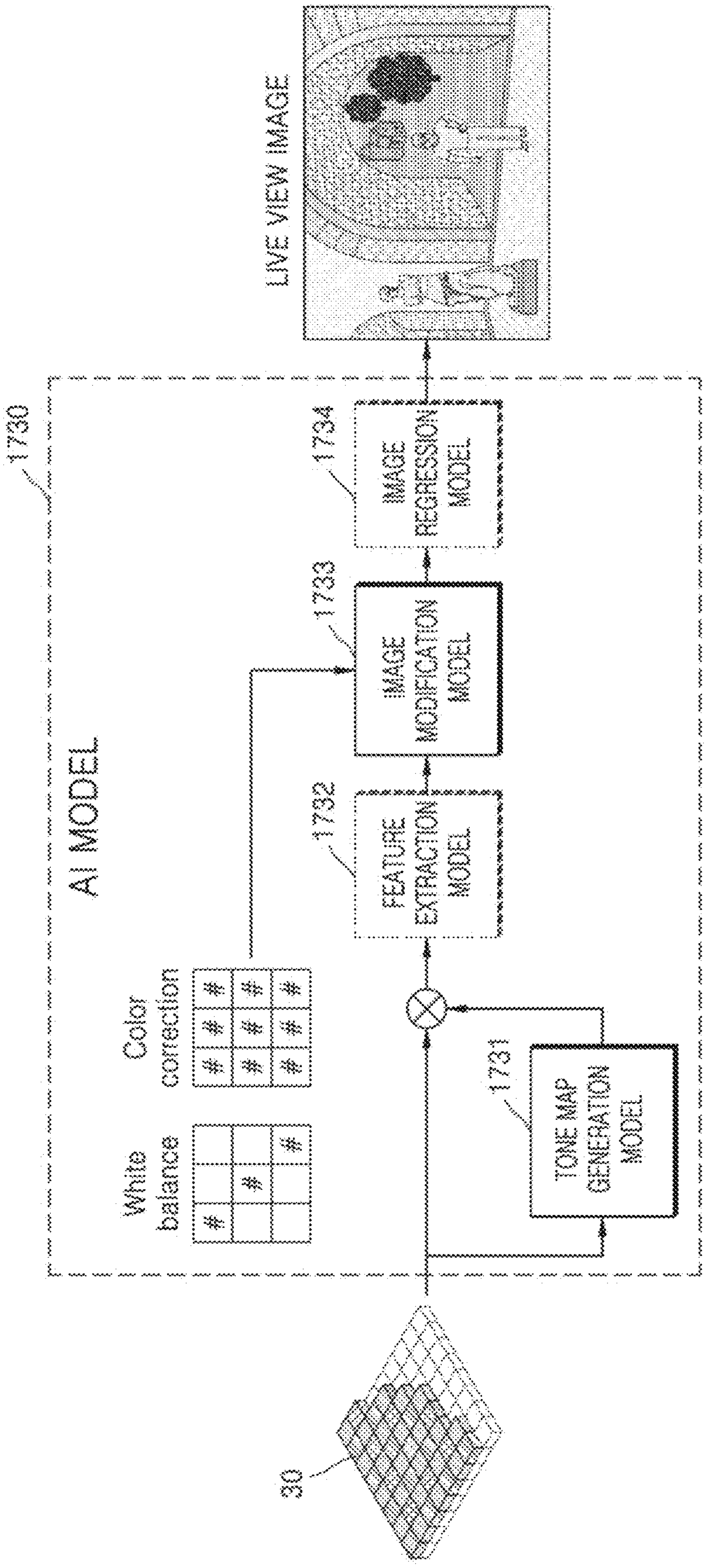
FIG. 10B is a view showing an example of deactivating a feature extraction model 1732 and an image regression model 1734 in the AI model 1730 to generate a live view image, according to an embodiment of the disclosure.

FIG. 10B is a view showing an example of deactivating the feature extraction model 1732 and the image regression model 1734 in the AI model 1730 to generate a live view image, according to an embodiment of the disclosure.

Referring to FIG. 10B, while the feature extraction model 1732 and the image regression model 1734 in the AI model 1730 are deactivated, a raw image may be input to the AI model 1730. The raw image may be input to the tone map generation model 1731, brightness of the raw image may be scaled based on a tone map output from the tone map generation model 1731, and the brightness-scaled raw image may be modified to generate a live view image. In this case, the AI model 1730 may be a model trained in the same manner as in FIG. 7 while the feature extraction model 1732 and the image regression model 1734 are deactivated.

Figure 10C:
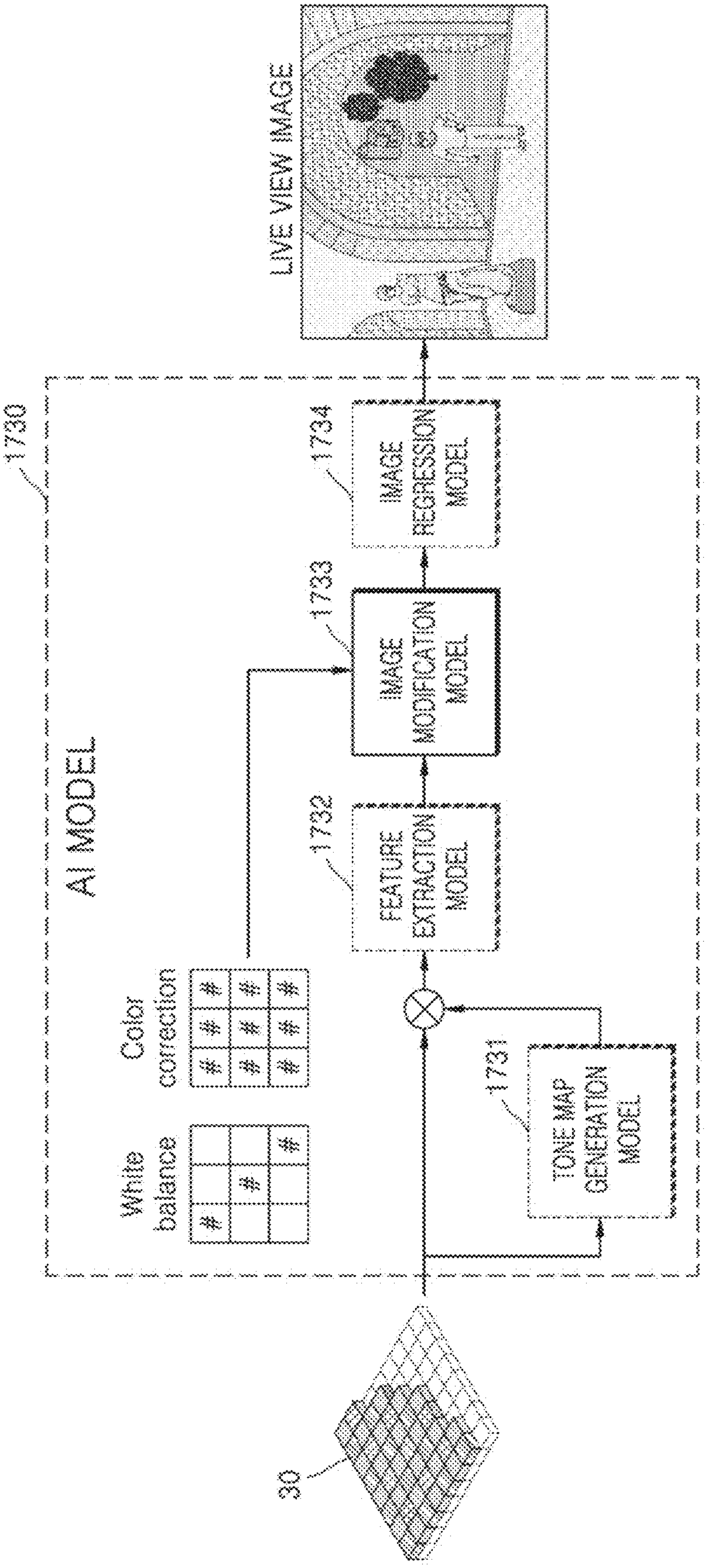
FIG. 10C is a view showing an example of deactivating the tone map generation model 1731, the feature extraction model 1732, and the image regression model 1734 in the AI model 1730 to generate a live view image, according to an embodiment of the disclosure.

FIG. 10C is a view showing an example of deactivating the tone map generation model 1731, the feature extraction model 1732, and the image regression model 1734 in the AI model 1730 to generate a live view image, according to an embodiment of the disclosure.

Referring to FIG. 10C, while the tone map generation model 1731, the feature extraction model 1732, and the image regression model 1734 in the AI model 1730 are deactivated, a raw image may be modified to generate a live view image.

The image modification model 1733 in FIGS. 10A to 10C may receive a white balance matrix value and a color correction matrix value as inputs, although other values may also be used. A plurality of AI models 1620 may be separately trained based on settings related to white balance adjustment and color correction. In this case, to generate the live view image, the AI model 1730 corresponding to a certain setting related to white balance adjustment and color correction may be loaded into the second memory 1720 and used by the second processor 1710. Even though the white balance matrix value and the color correction matrix value may not be input to the AI model 1730 loaded in the second memory 1720, the live view image that reflects specific white balance adjustment and color correction setting may be output from the AI model 1730 loaded in the second memory 1720.

Figure 11:
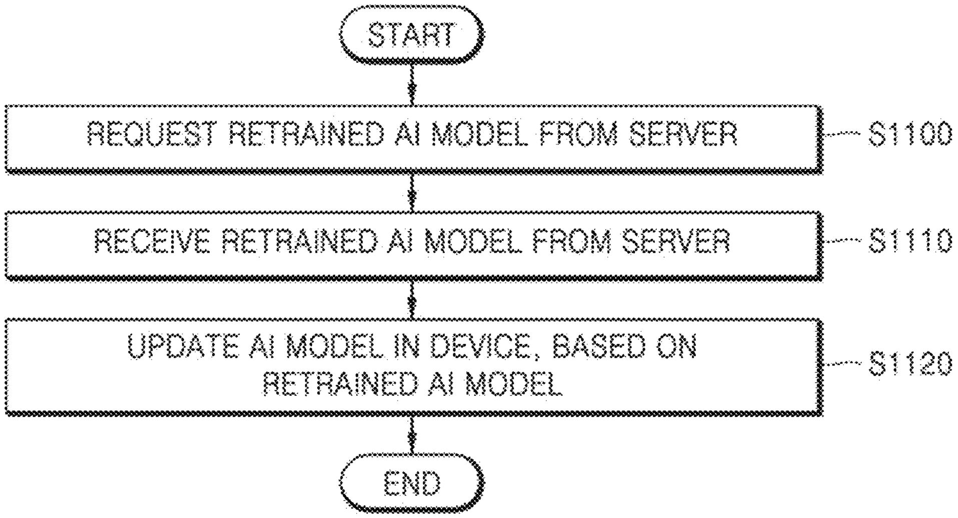
FIG. 11 is a flowchart of a method, performed by the device 1000, of updating the AI model 1620 by receiving a retrained AI model 1620 from a server, according to an embodiment of the disclosure.

FIG. 11 is a flowchart of a method, performed by the device 1000, of updating the AI model 1620 by receiving a retrained AI model 1620 from a server.

In operation S1100, the device 1000 may request a retrained AI model 1620 from the server. The AI model 1620 may be retrained by the server, and the server may provide, to the device 1000, notification information indicating that the retrained AI model 1620 is present. The device 1000 may display, on a screen, the notification information received from the server (not shown), and receive a user input for updating the AI model 1620. The device 1000 may provide information about photo attributes preferred by a user, to the to request the retrained AI model 1620 from the server.

The device 1000 may provide images captured by the device 1000, to the server to request the retrained AI model 1620 from the server (not shown). The server may analyze the images received from the device 1000, and retrain the AI model 1620 by using a reference raw image and a reference image related to a situation preferred by the user of the device 1000. For example, the server may identify the situation preferred by the user, e.g., a type of the device 1000 used by the user, a type of a subject in the images captured by the device 1000, an image style preferred by the user, or an environment of a place where the user usually shoots (e.g., indoor, outdoor, luminance, or weather), by analyzing the images received from the device 1000. The server may retrain the AI model 1620 by using the reference raw image and the reference image related to the situation preferred by the user.

Alternatively, for example, the device 1000 may provide information about a camera type or a lens type of the device 1000, to the server to request the retrained AI model 1620 from the server (not shown). The server (not shown) may retrain the AI model 1620 by using the reference raw image and the reference image related to the camera type or the lens type received from the device 1000.

Alternatively, the device 1000 may provide user preference information indicating an image style, a shooting environment, and subjects preferred by the user, to the server to request the retrained AI model 1620 from the server. The server may retrain the AI model 1620 by using the reference raw image and the reference image related to the user preference information received from the device 1000.

In operation S1110, the device 1000 may receive the retrained AI model 1620 from the server. When the device 1000 has provided, to the server, the information about the photo attributes preferred by the user, the server may provide, to the device 1000, the AI model 1620 retrained in relation to the photo attributes preferred by the user.

In operation S1120, the device 1000 may update the AI model 1620 in the device 1000, based on the retrained AI model 1620. The device 1000 may update the AI model 1620 in the device 1000, for example, by replacing the AI model 1620 in the device 1000 with the retrained AI model 1620 received from the server.

Figure 12:
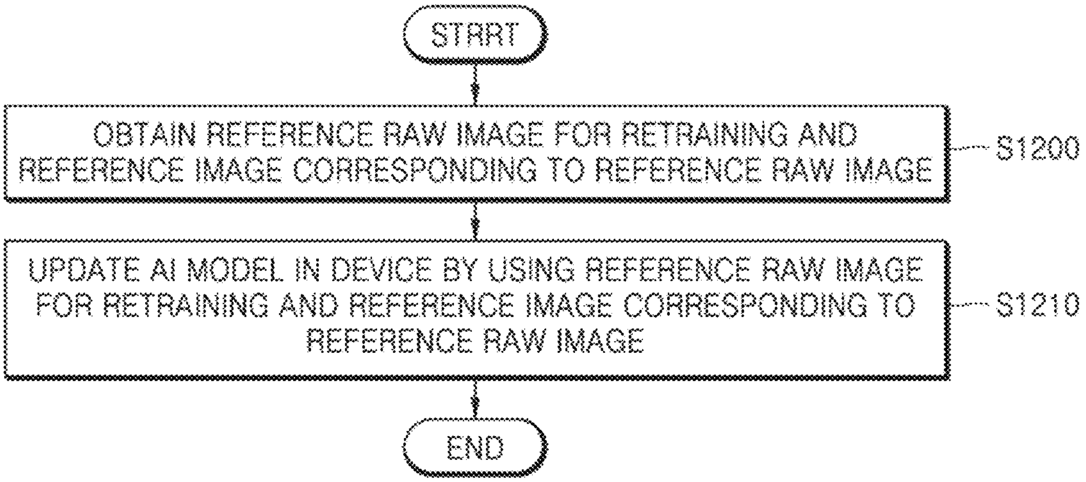
FIG. 12 is a flowchart of a method, performed by the device 1000, of retraining and updating the AI model 1620, according to an embodiment of the disclosure.

FIG. 12 is a flowchart of a method, performed by the device 1000, of retraining and updating the AI model 1620.

In operation S1200, the device 1000 may obtain a reference raw image for retraining and a reference image corresponding to the reference raw image. The reference image may be an image generated from the reference raw image for retraining. The device 1000 may request and receive, from a server, the reference raw image and the reference image for retraining the AI model 1620. In this case, the device 1000 may provide, to the server, photos captured by the device 1000 or information about photo attributes preferred by a user, and the server may provide, to the device 1000, the reference image and the reference raw image generated in relation to a situation preferred by the user.

For example, the device 1000 may provide images captured by the device 1000, to the server to request the reference raw image and the reference image for retraining the AI model 1620 from the server. The server may analyze the images received from the device 1000 and provide, to the device 1000, the reference raw image and the reference image related to a situation preferred by the user of the device 1000. For example, the server may identify the situation preferred by the user, e.g., a type of the device 1000 used by the user, a type of a subject in the images captured by the device 1000, an image style preferred by the user, or an environment of a place where the user usually shoots (e.g., indoor, outdoor, luminance, or weather), by analyzing the images received from the device 1000. The server may provide, to the device 1000, the reference raw image and the reference image related to the situation preferred by the user.

Alternatively, for example, the device 1000 may provide information about a camera type or a lens type of the device 1000, to the server to request the reference raw image and the reference image for retraining the AI model 1620 from the server. The server may provide, to the device 1000, the reference raw image and the reference image related to the camera type or the lens type received from the device 1000.

Alternatively, the device 1000 may provide user preference information indicating an image style, a shooting environment, and subjects preferred by the user, to the server to request the reference raw image and the reference image for retraining the AI model 1620 from the server. The server may provide, to the device 1000, the reference raw image and the reference image related to the user preference information received from the device 1000.

In operation S1210, the device 1000 may update the AI model 1620 in the device 1000 by using the reference raw image for retraining and the reference image corresponding to the reference raw image. The device 1000 may use the reference image received from the server, as a GT image, and retrain the AI model 1620 by inputting the reference raw image received from the server, to the AI model 1620 and comparing an output image output from the AI model 1620, with the reference image.

AI-related functions according to the disclosure are preformed using a processor and a memory. The processor may include one or more processors. In this case, the one or more processors may include a general-purpose processor (e.g., a CPU, an AP, and a DSP), a dedicated graphics processor (e.g., a GPU and a VPU), or a dedicated AI processor (e.g., a NPU). The one or more processors control input data to be processed based on a predefined operation rule or AI model stored in the memory. Alternatively, when the one or more processors include a dedicated AI processor, the dedicated AI processor may be designed in a hardware structure specialized to process a specific AI model.

The predefined operation rule or AI model is made through training. When the predefined operation rule or AI model is made through training, it means that a basic AI model is trained using a plurality of pieces of training data according to a learning algorithm and thus a predefined operation rule or AI model configured to perform a desired characteristic (or purpose) is made. The training may be performed by a device for performing AI operations according to the disclosure, or by a server and/or system. The learning algorithm may include, supervised learning, unsupervised learning, semi-supervised learning, or reinforcement learning, but is not limited to the above-mentioned examples.

The AI model may include a plurality of neural network layers. Each of the plurality of neural network layers has a plurality of weight values and performs neural network computation through computation between a computation result of a previous layer and the plurality of weight values. The plurality of weight values of the plurality of neural network layers may be optimized by a result of training the AI model. For example, the plurality of weight values may be updated to reduce or minimize a loss value or a cost value obtained by the AI model during the training process. An artificial neural network may include, for example, a CNN, a DNN, a RNN, a RBM, a DBN, a BRDNN, or a deep Q-network, but is not limited to the above-mentioned examples.

In an embodiment of the disclosure, a raw image may be used as input data of the AI model and output image data may be output from the AI model. The AI model may be made through training. When the AI model is made through training, it means that a basic AI model is trained using a plurality of pieces of training data according to a learning algorithm and thus a predefined operation rule or AI model configured to perform a desired characteristic (or purpose) is made. The AI model may include a plurality of neural network layers. Each of the plurality of neural network layers has a plurality of weight values and performs neural network computation through computation between a computation result of a previous layer and the plurality of weight values. The AI model may be used for object recognition, object tracking, image retrieval, human recognition, scene recognition, 3D reconstruction/localization, image enhancement, etc.

An embodiment of the disclosure may be implemented in the form of recording media including computer-executable instructions, e.g., program modules to be executed by the computer. The computer-readable media may be any available media that can be accessed by the computer, and include both volatile and non-volatile media, and removable and non-removable media. The computer-readable media may include computer storage media and communication media. The computer storage media include both volatile and non-volatile media, and removable and non-removable media implemented in any method or technology for storage of information such as computer-readable instructions, data structures, program modules, or other data. The communication media may typically include computer-readable instructions, data structures, program modules, or other data in modulated data signals.

The computer-readable storage media may be provided in the form of non-transitory storage media. When the storage medium is 'non-transitory', it means that the storage medium is tangible and does not include signals (e.g., electromagnetic waves), and it does not limit that data is semi-permanently or temporarily stored in the storage medium. For example, the 'non-transitory storage medium' may include a buffer storing data temporarily.

According to an embodiment, the method according to various embodiments of the disclosure may be included and provided in a computer program product. The computer program product may be traded as a commercial product between sellers and purchasers. The computer program product may be distributed in the form of machine-readable storage media (e.g., compact disc read-only memory (CD-ROM)), or be electronically distributed (e.g., downloaded or uploaded) via an application store (e.g., PlayStore™) or directly between two user devices (e.g., smartphones). For electronic distribution, at least a part of the computer program product (e.g., a downloadable app) may be temporarily generated or be at least temporarily stored in a machine-readable storage medium, e.g., memory of a server of a manufacturer, a server of an application store, or a relay server.

As used herein, the term "unit" may indicate a hardware component such as a processor or a circuit, and/or a software component executable by the hardware component such as the processor.

Throughout the disclosure, the expression "at least one of a, b or c" indicates only a, only b, only c, both a and b, both a and c, both b and c, all of a, b, and c, or variations thereof.

The above descriptions of the disclosure are provided for the purpose of illustration, and it will be understood by one of ordinary skill in the art that various changes in form and details may be easily made therein without departing from the scope of the disclosure. Therefore, it should be understood that the afore-described embodiments should be considered in a descriptive sense only and not for purposes of limitation. For example, each component described to be of a single type can be implemented in a distributed manner and, likewise, components described as being distributed can be implemented in a combined manner.

The scope of the disclosure is defined by the following claims rather than by the detailed description, and it should be understood that all modifications from the claims and their equivalents are included in the scope of the disclosure.

What is claimed is:

1. A method of performing image processing by a device, the method comprising:
- obtaining a raw image by controlling a camera sensor of the device, by using a first processor configured to control the device;
- inputting the raw image to a first artificial intelligence (AI) model trained to scale image brightness, by using a second processor configured to perform AI-based image processing on the raw image;
- obtaining tone map data output from the first AI model, by using the second processor;
- obtaining tone-modified image data by applying the tone map data to the raw image;
- extracting image features from the tone-modified image data by inputting the tone-modified image data into a second AI model;
- obtaining modified image features from a third AI model by inputting the image features and at least one of setting values related to image attributes into the third AI model; and
- generating an output image based on the modified images features.

2. The method of claim 1, wherein the first AI model is pre-trained to generate a tone map for scaling brightness of each pixel of the raw image,
- wherein the second AI model is pre-trained to analyze a plurality of preset features in the image, and
- wherein the third AI model is pre-trained to regress the output image from a plurality of feature images.

3. The method of claim 1, wherein the first AI model, the second AI model, and the third AI model are jointly trained based on a reference raw image, and a reference output image that is generated by performing preset image signal processing (ISP) on the reference raw image.

4. The method of claim 3, wherein the reference raw image is a combination of a plurality of raw images that are generated in a burst mode, and
- wherein the first AI model, the second AI model, and the third AI model are jointly trained, based on a loss between the reference output image, and an output image output through the first AI model, the second AI model, and the third AI model from the reference raw image.

5. The method of claim 1, wherein the raw image is generated through an image sensor and a color filter in the camera sensor, and has any one pattern from among a Bayer pattern, a RGBE pattern, an RYYB pattern, a CYYM pattern, a CYGM pattern, an RGBW Bayer pattern, and an X-trans pattern.

6. The method of claim 1, wherein the white balance adjustment setting and the color correction setting are input into the third AI model.

7. The method of claim 1, wherein the first AI model, the second AI model, and the third AI model are selected based on a user preference of the device.

8. The method of claim 1, further comprising:
- generating a live view image from the raw image, without using at least one of the first AI model, the second AI model, or the third AI model; and
- displaying the generated live view image.

9. The method of claim 1, further comprising retraining the first AI model, the second AI model, and the third AI model.

10. The method of claim 9, wherein the retraining comprises:
- obtaining a reference image for the retraining, and a reference raw image corresponding to the reference image; and
- retraining the first AI model, the second AI model, and the third AI model, by using the reference image and the reference raw image.

11. The method of claim 1, wherein the at least one of the setting values related to image attributes comprises a white balance adjustment setting or a color correction setting.

12. A device for performing image processing, the device comprising:
- a camera sensor;
- a display;
- a first memory storing first instructions for controlling the device;
- a first processor configured to execute the first instructions stored in the first memory;
- a second memory storing at least one artificial intelligence (AI) model for performing image processing on a raw image, and second instructions related to execution of the at least one AI model; and
- a second processor configured to execute the at least one AI model and second instructions stored in the second memory,
- wherein the first processor is further configured to obtain the raw image by using the camera sensor,
- wherein the second processor is further configured to:
  - input the raw image to a first AI model trained to scale image brightness;
  - obtain tone map data output from the first AI model;
  - obtain tone-modified image data by applying the tone map data to the raw image;
  - extract image features from the tone-modified image by inputting the tone-modified image data into a second AI model;
  - obtain modified image features from a third AI model by inputting the image features and at least one of setting values related to image attributes into the third AI model; and
  - generate an output image based on the modified images features,
- wherein the first processor is further configured to store, in the first memory, the output image.

13. The device of claim 12, wherein the first AI model is pre-trained to generate a tone map for scaling brightness of each pixel of the raw image,
- wherein the second AI model is pre-trained to analyze a plurality of preset features in the image, and wherein the third AI model is pre-trained to regress the output image from a plurality of feature images.

14. The device of claim 12, wherein the first AI model, the second AI model, and the third AI model are jointly trained based on a reference raw image, and a reference output image that is generated by performing preset image signal processing (ISP) on the reference raw image.

15. The device of claim 14, wherein the reference raw image is a combination of a plurality of raw images that are generated in a burst mode, and wherein the first AI model, the second AI model, and the third AI model are jointly trained, based on a loss between the reference output image, and an output image output through the first AI model, the second AI model, and the third AI model from the reference raw image.

16. The device of claim 12, wherein the second processor is further configured to execute the second instructions to generate a live view image from the raw image, without using at least one of the first AI model, the second AI model, or the third AI model; and wherein the display is configured to display the generated live view image.

17. A non-transitory computer-readable recording medium having recorded thereon a program for executing a method of performing image processing by a device, the method comprising:

obtaining a raw image by a camera sensor of the device, by using a first processor configured to control the device;

inputting the raw image to a first artificial intelligence (AI) model trained to scale image brightness, by using a second processor configured to perform AI-based image processing on the raw image;

obtaining tone map data output from the first AI model, by using the second processor;

obtaining tone-modified image data by applying the tone map data to the raw image;

extracting image features from the tone-modified image data by inputting the tone-modified image data into a second AI model;

obtaining modified image features from a third AI model by inputting the image features and at least one of setting values related to image attributes into the third AI model; and generating an output image generated based on the tone map data.

* * * * *